United States Patent
Al Massaeed et al.

(10) Patent No.: US 12,190,872 B2
(45) Date of Patent: Jan. 7, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Ali Ahmad Adel Al Massaeed, St. Amman (JO); Abdelrahman Mustafa Mahmoud Yaseen, St. Amman (JO); Shrouq Walid Jamil Sabah, St. Amman (JO)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/713,546

(22) Filed: Apr. 5, 2022

(65) Prior Publication Data
US 2023/0048573 A1 Feb. 16, 2023

Related U.S. Application Data

(63) Continuation of application No. PCT/KR2022/003555, filed on Mar. 15, 2022.

(30) Foreign Application Priority Data

Aug. 10, 2021 (KR) .................. 10-2021-0105597

(51) Int. Cl.
*G10L 15/00* (2013.01)
*G06F 3/16* (2006.01)
(Continued)

(52) U.S. Cl.
CPC .......... *G10L 15/1815* (2013.01); *G06F 3/167* (2013.01); *G10L 15/22* (2013.01); *G10L 2015/223* (2013.01); *G10L 15/30* (2013.01)

(58) Field of Classification Search
CPC ......... G10L 15/22; G10L 15/08; G10L 15/30; G10L 15/04; G10L 15/02; G10L 15/1815;
(Continued)

(56) References Cited

U.S. PATENT DOCUMENTS 10,733,982 B2 * 8/2020 Grupen ................... G10L 15/22
10,991,373 B1 * 4/2021 Wang ...................... G06F 21/52
(Continued)

FOREIGN PATENT DOCUMENTS

EP        3 286 633 B1    7/2022
JP        2016-126294 A   7/2016
(Continued)

OTHER PUBLICATIONS

PCT International Search Report dated Jun. 20, 2022 for PCT/KR2022/003555.
PCT Written Opinion dated Jun. 20, 2022 for PCT/KR2022/003555.

*Primary Examiner* — Abdelali Serrou
(74) *Attorney, Agent, or Firm* — Nixon & Vanderhye P.C.

(57) ABSTRACT

An electronic apparatus includes: a memory storing one or more commands; and a processor connected to the memory and configured to control the electronic apparatus, wherein the processor is configured, by executing the one or more instructions, to: identify a first intention word and a first target word from first speech, acquire second speech received after the first speech based on at least one of the identified first intention word or the identified first target word not matching a word stored in the memory, acquire a similarity between the first speech and the second speech,
(Continued)

and acquire response information based on the first speech and the second speech based on the similarity being a threshold value or more.

16 Claims, 32 Drawing Sheets

(51) Int. Cl.
*G10L 15/18* (2013.01)
*G10L 15/22* (2006.01)
*G10L 15/30* (2013.01)

(58) Field of Classification Search
CPC ..... G10L 15/1822; G10L 17/00; G10L 17/22; G10L 2015/223; G10L 2015/225; G10L 2015/227; G10L 25/72; G10L 17/02; G10L 2015/221; G06F 3/167; G06F 11/2094; G06F 16/24578; G06F 16/248; G06F 16/9535; G06F 3/0619; G06F 3/065; G06F 3/0652; G06F 3/0665; G06F 3/067; G06F 3/0683; G06F 11/0709; G06F 11/0712; G06F 11/0727; G06F 2201/81; G06F 2201/815; G06F 3/16
See application file for complete search history.

(56) References Cited

U.S. PATENT DOCUMENTS

| | | | |
|---|---|---|---|
| 11,670,289 B2 | 6/2023 | Gruber et al. | |
| 11,749,256 B2* | 9/2023 | McMahon | G10L 13/047 |
| | | | 704/260 |
| 11,756,544 B2* | 9/2023 | Sharifi | G06F 3/0481 |
| | | | 704/257 |
| 2012/0035935 A1* | 2/2012 | Park | G10L 15/22 |
| | | | 704/E21.001 |
| 2012/0313849 A1 | 12/2012 | Bak et al. | |
| 2013/0033643 A1* | 2/2013 | Kim | G06F 3/0484 |
| | | | 704/275 |
| 2019/0019518 A1 | 1/2019 | Kojima et al. | |
| 2020/0143809 A1 | 5/2020 | Lee et al. | |
| 2021/0020177 A1 | 1/2021 | Oh et al. | |

FOREIGN PATENT DOCUMENTS

| | | |
|---|---|---|
| KR | 10-1897492 B1 | 9/2018 |
| KR | 10-2019-0114325 A | 10/2019 |
| KR | 10-2020-0050373 A | 5/2020 |

\* cited by examiner

|   | m | e | s | s | a | g | e |
|---|---|---|---|---|---|---|---|
| p | 0 | 0 | 0 | 0 | 0 | 0 | 0 |
| l | 0 | 0 | 0 | 0 | 0 | 0 | 0 |
| e | 0 | 1 | 1 | 1 | 1 | 1 | 1 |
| a | 0 | 1 | 1 | 1 | 2 | 2 | 2 |
| s | 0 | 1 | 2 | 2 | 2 | 2 | 2 |

2520

|   | m | e | s | s | a | g | e |
|---|---|---|---|---|---|---|---|
| m | 1 | 1 | 1 | 1 | 1 | 1 | 1 |
| a | 1 | 1 | 1 | 1 | 2 | 2 | 2 |
| s | 1 | 1 | 2 | 2 | 2 | 2 | 2 |
| s | 1 | 1 | 2 | 2 | 3 | 3 | 3 |
| a | 1 | 1 | 2 | 2 | 4 | 4 | 4 |
| g | 1 | 1 | 2 | 2 | 4 | 5 | 5 |
| e | 1 | 2 | 2 | 2 | 4 | 5 | 6 |

FIG. 28

| CONVERSATION IDENTIFICATION INFORMATION | USER SPEECH IDENTIFICATION INFORMATION | TEXT INFORMATION |
|---|---|---|
| conv-id-222 | uid-4567 | Please call mails |
| conv-id-222 | uid-4690 | Please call miles |
| conv-id-123 | uid-5522 | Massage Mills |
| conv-id-123 | uid-5530 | Message Miles |
| conv-id-676 | uid-1234 | Delete the fight reminder |
| conv-id-676 | uid-1235 | Dial Miles |

2810

| CONVERSATION IDENTIFICATION INFORMATION | USER SPEECH IDENTIFICATION INFORMATION | NLU | RESPONSE INFORMATION |
|---|---|---|---|
| conv-id-222 | uid-4567 | {Intent: Phone_Call target: { ContactName (mails)}} | I couldn't find mails in your Contacts. Who do you want to call? |
| conv-id-222 | uid-4690 | {Intent: Phone_Call target: {ContactName (miles)}} | Just a moment while while I call Miles. |
| conv-id-123 | uid-5522 | Undefined | I couldn't understand that. Here are some services you can try. |
| conv-id-123 | uid-5530 | {Intent: Phone_SendSMS target: { ContactName (mails)}} | What would you like the the message for Miles to say? |
| conv-id-676 | uid-1234 | {Intent: Alarm_Delete target: {AlarmName (fight)}} | Nothing came up for fight |
| conv-id-676 | uid-1235 | {Intent: Phone_Call target: { ContactName (miles)}} | Calling Miles |

2820

ELECTRONIC APPARATUS AND CONTROLLING METHOD THEREOF

CROSS-REFERENCE TO RELATED APPLICATIONS

This application is a continuation of International Application No. PCT/KR2022/003555 designating the United States, filed on Mar. 15, 2022, in the Korean Intellectual Property Receiving Office and claiming priority to Korean Patent Application No. 10-2021-0105597, filed on Aug. 10, 2021, in the Korean Intellectual Property Office, the disclosures of which are incorporated by reference herein in their entireties.

BACKGROUND

Field

The disclosure relates to an electronic apparatus and a controlling method thereof, and for example, to an electronic apparatus that performs speech recognition based on user's speech, and a controlling method thereof.

Description of Related Art

Automatic speech recognition (ASR) may refer to a speech recognition system that converts speech into text.

Natural language understanding (NLU) may refer to a technology that analyzes text according to the user's intention. Specifically, the NLU may refer to a technology that identifies the user's intention based on the text converted by the ASR corresponding to the user's speech (or the user voice). The NLU may refer to a technology that finds not only the text itself corresponding to the user's speech, but also similar or hidden meanings. An artificial intelligence model trained with various learning data may be used to analyze the user's intention.

When the user's speech clearly includes the user's intention, a speech recognition service may be appropriately provided to the user based on ASR and NLU. However, a command different from the user's intention may be input into an electronic apparatus due to inaccuracy in pronunciation or confusion of commands depending on the user. The command different from the user's intention may be recognized as a misrecognized word.

Accordingly, there is a need for the electronic apparatus to provide a response to the user by correcting the misrecognized word to provide a response suitable for the user's intention. In general, in order to clearly understand the user's intention, the electronic apparatus may acquire new user's speech and provide a speech recognition service. For example, when user's speech "massage miles" is received, the electronic apparatus may not perform a function for "massage". However, when new user's speech of "message mills" is received, the electronic apparatus may provide the user with a function of transmitting a message to "miles" (person's name).

In a general speech recognition technology, when new user's speech is received, the user's intention is analyzed only for the newly input user's speech. However, in that the new user's speech is uttered to supplement previous user's speech, if the previous user's speech is not considered at all, accuracy or continuity of an operation of detecting the user's intention may be deteriorated.

SUMMARY

Embodiments of the disclosure an electronic apparatus for acquiring a response to be provided to a user by comparing similarity between previous user's speech and new user's speech when a response corresponding to the user's speech may not be provided, and a controlling method thereof.

According to an example embodiment of the disclosure, an electronic apparatus includes: a memory storing one or more commands; and a processor connected to the memory and configured to control the electronic apparatus, wherein the processor is configured, by executing the one or more instructions, to: identify a first intention word and a first target word from a first speech (or first user voice), acquire second speech (or second user voice) received after the first speech based on at least one of the identified first intention word or the identified first target word not matching a word stored in the memory, acquire a similarity between the first speech and the second speech, and acquire response information based on the first speech and the second speech based on the similarity being a threshold value or more.

The processor may be configured to acquire a user interface (UI) configured to provide a guide to utter the second speech based on at least one of the identified first intention word or the identified first target word not matching the word stored in the memory.

The processor may be configured to acquire speech received within a preset time as the second speech based on at least one of the identified first intention word or the identified first target word not matching the word stored in the memory.

The processor may be configured to: acquire a second intention word included in the second speech based on the first intention word not matching an intention word stored in the memory and the first target word matching a target word stored in the memory, acquire first similarity between the first intention word and the second intention word based on the second intention word matching the intention word stored in the memory, and acquire response information based on the second intention word and the first target word based on the first similarity being a threshold value or more.

The processor may be configured to acquire a UI including information notifying that the response information is not acquired based on the second intention word not matching the intention word stored in the memory, and the UI may include the second intention word.

The processor may be configured to: acquire a second target word included in the second speech based on the first intention word matching an intention word stored in the memory and the first target word not matching a target word stored in the memory, acquire a second similarity between the first target word and the second target word based on the second target word matching the target word stored in the memory, and acquire response information based on the first intention word and the second target word based on the second similarity being a threshold value or more.

The processor may be configured to acquire a UI including information notifying that the response information is not acquired based on the second target word not matching the target word stored in the memory, and the UI may include the second target word.

The processor may be configured to: acquire a second intention word and a second target word included in the second speech based on the first intention word not matching an intention word stored in the memory and the first target word not matching a target word stored in the memory, acquire first similarity between the first intention word and the second intention word based on the second intention word matching the intention word stored in the memory, acquire a second similarity between the first target word and the second target word based on the second target word matching the target word stored in the memory, and acquire response information based on the second intention word and the second target word based on the first similarity being a threshold value or more and the second similarity being the threshold value or more.

The processor may be configured to acquire a UI including information notifying that the response information is not acquired based on the intention word not matching the intention word stored in the memory or the second target word not matching the target word stored in the memory, and the UI may include the second target word.

The processor may be configured to: acquire a second intention word and a second target word from the second speech, acquire a first similarity between the first intention word and the second intention word, acquire a second similarity between the first target word and the second target word, and acquire third speech (or third user voice) received after the second speech based on the first similarity being less than a threshold value or the second similarity being less than a second threshold value.

According to an example embodiment of the disclosure, a method of controlling an electronic apparatus includes: identifying a first intention word and a first target word from first speech; acquiring second speech received after the first speech based on at least one of the identified first intention word or the identified first target word not matching a word stored in the memory of the electronic apparatus; acquiring a similarity between the first speech and the second speech; and acquiring response information based on the first speech and the second speech based on the similarity being a threshold value or more.

The method may further include acquiring a user interface (UI) configured to provide a guide to utter the second speech based on at least one of the identified first intention word or the identified first target word not matching the word stored in the memory.

The method may further include acquiring speech received within a preset time as the second speech based on at least one of the identified first intention word or the identified first target word not matching the word stored in the memory.

The method may further include: acquiring a second intention word included in the second speech based on the first intention word not matching an intention word stored in the memory and the first target word matching a target word stored in the memory, wherein in the acquiring of the similarity, a first similarity between the first intention word and the second intention word may be acquired based on the second intention word matching the intention word stored in the memory, and in the acquiring of the response information, the response information may be acquired based on the second intention word and the first target word based on the first similarity being a threshold value or more.

The method may further include acquiring a UI including information notifying that the response information is not acquired based on the second intention word not matching the intention word stored in the memory, wherein the UI may include the second intention word.

The method may further include: acquiring a second target word included in the second speech based on the first intention word matching an intention word stored in the memory and the first target word not matching a target word stored in the memory, wherein in the acquiring of the similarity, a second similarity between the first target word and the second target word may be acquired based on the second target word matching the target word stored in the memory, and in the acquiring of the response information, the response information may be acquired based on the first intention word and the second target word based on the second similarity being a threshold value or more.

The method may further include acquiring a UI including information notifying that the response information is not acquired based on the second target word not matching the target word stored in the memory, wherein the UI may include the second target word.

The method may further include: acquiring a second intention word and a second target word included in the second speech based on the first intention word not matching an intention word stored in the memory and the first target word not matching a target word stored in the memory, wherein in the acquiring of the similarity, a first similarity between the first intention word and the second intention word may be acquired based on the second intention word matching the intention word stored in the memory, and a second similarity between the first target word and the second target word may be acquired based on the second target word matching the target word stored in the memory, and in the acquiring of the response information, the response information may be acquired based on the second intention word and the second target word based on the first similarity being a threshold value or more and the second similarity being the threshold value or more.

The method may further include acquiring a UI including information notifying that the response information is not acquired based on the intention word not matching the intention word stored in the memory or the second target word not matching the target word stored in the memory, wherein the UI may include the second target word.

The method may further include: acquiring a second intention word and a second target word from the second speech, wherein in the acquiring of the similarity, a first similarity between the first intention word and the second intention word may be acquired, and a second similarity between the first target word and the second target word may be acquired, and the method may further include acquiring third speech received after the second speech based on the first similarity being less than a threshold value or the second similarity being less than a second threshold value.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 25 is a diagram illustrating an example process of calculating similarity according to various embodiments;

FIG. 28 is a table illustrating an example operation of acquiring a response corresponding to speech according to various embodiments;

DETAILED DESCRIPTION

Figure 1:
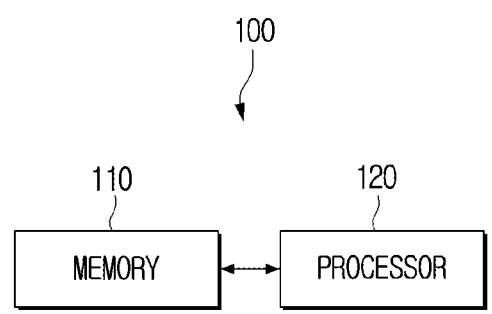
FIG. 1 is a block diagram illustrating an example configuration of an electronic apparatus according to various embodiments.

Hereinafter, the disclosure will be described in greater detail with reference to the accompanying drawings.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, terms may be arbitrarily selected. In this case, the meaning of such terms will be mentioned in detail in a corresponding description portion of the disclosure. Therefore, the terms used in the disclosure should be defined based pm the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expression "at least one of A and/or B" should be understood to represent either "A" or "B" or any one of "A and B".

Expressions such as "first," or "second," used in the disclosure may modify various components regardless of order and/or importance, and are used to distinguish one component from another component, and do not limit the corresponding components.

When it is mentioned that any component (e.g., a first component) is (operatively or communicatively) coupled with/to or is connected to another component (e.g., a second component), it is to be understood that any component is directly coupled to another component or may be coupled to another component through another component (e.g., a third component).

Singular expressions include plural expressions unless the context clearly indicates otherwise. It should be further understood that the term "include" or "constituted" used in the application specifies the presence of features, numerals, steps, operations, components, parts mentioned in the disclosure, or combinations thereof, but do not preclude the presence or addition of one or more other features, numerals, steps, operations, components, parts, or combinations thereof.

In the disclosure, a 'module' or a '~er/~or' may perform at least one function or operation, and be implemented by hardware or software or be implemented by a combination of hardware and software. In addition, a plurality of 'modules' or a plurality of '~ers/ors' may be integrated in at least one module and be implemented as at least one processor (not illustrated) except for a 'module' or an '~er/or' that needs to be implemented by specific hardware.

In the disclosure, a term "user" may be a person that uses the electronic apparatus or an apparatus (e.g., an artificial intelligence electronic apparatus) that uses the electronic apparatus.

Hereinafter, various embodiments of the disclosure will be described in greater detail with reference to the accompanying drawings.

FIG. 1 is a block diagram illustrating an example configuration of an electronic apparatus 100 according to various embodiments.

Referring to FIG. 1, an electronic apparatus 100 may include a memory 110 and a processor (e.g., including processing circuitry) 120.

The electronic apparatus 100 according to various embodiments of the disclosure may include at least one of, for example, an without limitation, a smartphone, a tablet personal computer (PC), a mobile phone, a desktop PC, a laptop PC, a personal digital assistant (PDA), a portable multimedia player (PMP), or the like. In various embodiments, the electronic apparatus 100 may include at least one of, for example, and without limitation, a television, a digital video disk (DVD) player, a media box (e.g., Samsung HomeSync™, Apple TV™, or Google TV™), or the like.

The memory 110 may be implemented as an internal memory such as a ROM (e.g., electrically erasable programmable read-only memory (EEPROM)) or a RAM included in the processor 120, or implemented as a memory separate from the processor 120. In this case, the memory 110 may be implemented in the form of a memory embedded in the electronic apparatus 100 or the form of a memory attachable to and detachable from the electronic apparatus 100, depending on the purpose of data storage. For example, data for driving the electronic apparatus 100 may be stored in the memory embedded in the electronic apparatus 100, and data for extended function of the electronic apparatus 100 may be stored in the memory attachable to and detachable from the electronic apparatus 100.

The memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)), and the memory attachable to and detachable from the electronic apparatus 100 may be implemented in the form such as a memory card (e.g., a compact flash (CF), a secure digital (SD), a micro secure digital (Micro-SD), a mini secure digital (Mini-SD), an extreme digital (xD), a multimedia card (MMC), or the like), an external memory (e.g., a USB memory) connectable to a USB port, or the like.

The memory 110 may store one or more instructions. The processor 120 may include various processing circuitry and perform various operations based on the instructions stored in the memory 110.

The memory 110 may store a plurality intention words and a plurality of target words. The plurality of intention words stored in the memory 110 may include commands related to applications executable in the electronic apparatus 100. Here, the plurality of target words stored in the memory 110 may refer, for example, to detailed information or essential information required to use an application.

According to an implementation example, the memory 110 may classify and store the intention words and the target words for each type. For example, the memory 110 may store a plurality words corresponding to the "intention words". In addition, the memory 110 may store a plurality words corresponding to the "target words". The expressions such as a plurality of intention words and a plurality of target words are used to classify the types of the plurality of words.

The processor 120 may include various processing circuitry and perform an overall control operation of the electronic apparatus 100. For example, the processor 120 functions to control an overall operation of the electronic apparatus 100.

The processor 120 may be implemented as a digital signal processor (DSP), a microprocessor, or a time controller (TCON) that processes a digital signal. However, the processor 120 is not limited thereto, but may include one or more of a central processing unit (CPU), a micro controller unit (MCU), a micro processing unit (MPU), a controller, an application processor (AP), a graphics-processing unit (GPU), a communication processor (CP), and an ARM processor, or may be defined as the corresponding term. In addition, the processor 120 may also be implemented as a system-on-chip (SoC) or a large scale integration (LSI) in which a processing algorithm is embedded, and may also be implemented in the form of a field programmable gate array (FPGA). In addition, the processor 120 may perform various functions by executing computer executable instructions stored in the memory 110.

The processor 120 may be connected to the memory 110 to control the electronic apparatus 100, and may, by executing one or more instructions, identify a first intention word and a first target word from first user's speech (or first user voice or first speech), acquire second user's speech (or second user voice or second speech) received after the first user's speech when at least one of the identified first intention word or the identified first target word does not match a word stored in the memory 110, acquire similarity between the first user's speech and the second user's speech, and acquire response information based on the first user's speech and the second user's speech when the similarity is a threshold value or more.

The processor 120 may acquire the first user's speech.

As an example, the processor 120 may acquire the first user's speech received through a microphone 170 (refer to FIG. 2) of the electronic apparatus 100. The microphone 170 may convert a received audio signal into a digital signal. In addition, the processor 120 may acquire the converted digital signal. The processor 120 may acquire the digital signal corresponding to the first user's speech as text information corresponding to the first user's speech. The processor 120 may use the text information corresponding to the first user's speech using a speech-text conversion model. In the following description, the description is made using speech itself or words instead of text information.

As another example, the processor 120 may acquire the first user's speech from an external device (not illustrated). The external device may be a device connected to the electronic apparatus through short-range communication, an external server, or a remote control device corresponding to the electronic apparatus 100.

The processor 120 may use an automatic speech recognition (ASR) function when directly acquiring text information for user's speech.

The processor 120 may identify an intention word and a target word among a plurality of words included in the text information corresponding to the first user's speech.

The intention word may refer to a command related to a function of the electronic apparatus 100 that the user intends to use. For example, the intention word may be a word such as message, phone, music, TV, or the like. The processor 120 may identify an application that the user intends to execute based on the intention word.

The target word may refer to detailed information related to a function used by the user. For example, the target word may be a word such as information of a specific individual, a title or singer of a specific song, a channel, or the like. The processor 120 may determine which detailed information to input when executing the application based on the target word.

The processor 120 may identify a plurality of words from the text information corresponding to the first user's speech. In addition, the processor 120 may identify an intention word and a target word among the plurality of words using a word classification model. The word classification model may refer to an artificial intelligence model that performs a function of classifying a type of word. For example, it is assumed that text information "please message mills" is acquired. The processor 120 may identify "please" as a word meaning a request or an instruction, identify "message" as an intention word including a user's intention, and identify "mills" as a target word representing detailed information related to the user's intention using the word classification model.

For example, the processor 120 may acquire a first intention word and a first target word from the first user's speech using the word classification model. In addition, the processor 120 may identify whether the first intention word or the first target word is a word stored in the memory 110.

Even if the first intention word and the first target word are simply identified from the first user's speech, if the electronic apparatus 100 may not perform a related function, the processor 120 may provide a response requested (or intended) by the user. Accordingly, the processor 120 may identify whether both the first intention word and the first target word are pre-stored in the memory 110. The word pre-stored in the memory 110 may refer, for example, to the electronic apparatus 100 performing the related operation. For example, when "message" is pre-stored as an intention word in the memory 110, the processor 120 may perform an operation corresponding to the first intention word ("message"). In addition, when "mills" is pre-stored as a target word in the memory 110, the processor 120 may perform an operation of performing a specific function on the first target word ("mills").

An operation (e.g., first operation) of identifying the intention word and the target word in the user's speech and an operation (e.g., second operation) of identifying whether the identified intention word and target word are pre-stored as the intention word and the target word, respectively, in the memory 110 may be different from each other. The first operation may be an operation of classifying the types of words included in the user's speech, and the second operation may be an operation of determining whether the electronic apparatus 100 may provide an appropriate response (or service) based on the recognized words.

An operation of determining whether the intention word (or target word) included in the user's speech matches the intention word (or target word) stored in the memory 110 may be described as an operation of determining whether the intention word (or target word) included in the user's speech is pre-stored in the memory 110.

The processor 120 may provide a complete response corresponding to the first user's speech only when both the first intention word and the first target word are pre-stored in the memory 110. When the first intention word is not pre-stored in the memory 110, the processor 120 may not execute a function corresponding to the first intention word. In addition, when the first target word is not pre-stored in the memory 110, the processor 120 may not execute a detailed operation corresponding to the first target word.

When at least one of the first intention word or the first target word is not pre-stored in the memory 110, the processor 120 may acquire second user's speech received after the first user's speech is received.

According to an embodiment, to induce the user to utter a new utterance, the processor 120 may provide the user with a user interface (UI) guiding the user to utter new user's speech.

On the other hand, when at least one of the identified first intention word or the identified first target word does not match the word stored in the memory 110, the processor 120 may acquire a UI guiding to utter the second user's speech.

The processor 120 may provide the acquired UI to the user, and the user may utter new second user's speech through the UI.

According to an embodiment, the processor 120 may acquire continuously received user's speeches as the first user's speech and the second user's speech. Specifically, the processor 120 may acquire, as the second user's speech, only speech newly received within a predetermined (or specified) time (e.g., 10 seconds) after the first user's speech is received.

On the other hand, when at least one of the identified first intention word or the identified first target word does not match the word stored in the memory 110, the processor 120 may acquire the user's speech received within a preset time as the second user's speech.

According to an embodiment, the utterance subject of the first user's speech and the second user's speech may be the same user. According to an embodiment, the utterance subject of the first user's speech and the second user's speech may be different.

The second user's speech may include at least one of the second intention word or the second target word. Because the second user's speech corresponds to speech for supplementing the first user's speech, the second user's speech may not necessarily include both the second intention word and the second target word. Accordingly, the processor 120 may acquire, from the second user's speech, words that are insufficient to generate a complete response from the first user's speech.

An operation of an electronic apparatus according to an embodiment will be described.

The processor 120 may acquire the second intention word included in the second user's speech when the first intention word does not match the intention word stored in the memory 110 and the first target word matches the target word stored in the memory 110, acquire first similarity between the first intention word and the second intention word when the second intention word matches the intention word stored in the memory 110, and acquire response information based on the second intention word and the first target word when the first similarity is a threshold value or more.

Because the first intention word included in the first user's speech is not pre-stored in the memory 110, the processor 120 may not acquire (or generate) complete response information only with the first user's speech. Accordingly, the processor 120 may acquire the second user's speech to supplement the first user's speech. When the second intention word included in the newly acquired second user's speech matches the intention word stored in the memory 110, the processor 120 may acquire the complete response information based on the first user's speech and the second user's speech.

An example in which the first intention word does not match the intention word stored in the memory 110 and the first target word matches the target word stored in the memory 110 will be described in greater detail below with reference to FIG. 5.

Further, an example in which the first intention word does not match the intention word stored in the memory 110 but the second intention word matches the intention word stored in the memory 110 will be described in greater detail below with reference to FIGS. 6 and 7.

When the second intention word does not match the intention word stored in the memory 110, the processor 120 may acquire a UI including information notifying that the response information may not be acquired, and the UI may include the second intention word.

Because the second intention word included in the second user's speech is not pre-stored in the memory 110, the processor 120 may not acquire complete response information even in consideration of both the first user's speech and the second user's speech.

An example in which both the first intention word and the second intention word do not match the words stored in the memory 110 will be described in greater detail below with reference to FIGS. 8 and 9.

An operation of an electronic apparatus according to an embodiment will be described.

The processor 120 may acquire the second target word included in the second user's speech when the first intention word matches the intention word stored in the memory 110 and the first target word does not match the target word stored in the memory 110, acquire second similarity between the first target word and the second target word when the second target word matches the target word stored in the memory 110, and acquire response information based on the first intention word and the second target word when the second similarity is a threshold value or more.

Because the first target word included in the first user's speech is not pre-stored in the memory 110, the processor 120 may not acquire (or generate) complete response information only with the first user's speech. Accordingly, the processor 120 may acquire the second user's speech to supplement the first user's speech. When the second target word included in the newly acquired second user's speech matches the target word stored in the memory 110, the processor 120 may acquire the complete response information based on the first user's speech and the second user's speech.

An example in which the first intention word matches the intention word stored in the memory 110 and the first target word does not match the target word stored in the memory 110 will be described in greater detail below with reference to FIG. 10.

An example in which the first target word does not match the target word stored in the memory 110 but the second target word matches the target word stored in the memory 110 will be described in greater detail below with reference to FIGS. 11 and 13.

When the second target word does not match the target word stored in the memory 110, the processor 120 may acquire a UI including information notifying that the response information may not be acquired, and the UI may include the second target word.

Because the second target word included in the second user's speech is not pre-stored in the memory 110, the processor 120 may not acquire complete response information even in consideration of both the first user's speech and the second user's speech.

An example in which both the first target word and the second target word do not match the words stored in the memory 110 will be described in greater detail below with reference to FIGS. 12 and 14.

An operation of an electronic apparatus according to still an embodiment will be described.

The processor 120 may acquire the second intention word and the second target word included in the second user's speech when the first intention word does not match the intention word stored in the memory 110 and the first target word does not match the target word stored in the memory 110, acquire first similarity between the first intention word and the second intention word when the second intention word matches the intention word stored in the memory 110, acquire second similarity between the first target word and the second target word when the second target word matches the target word stored in the memory 110, and acquire response information based on the second intention word and the second target word when the first similarity is a threshold value or more and the second similarity is the threshold value or more.

Because the first intention word and the first target included in the first user's speech are not pre-stored in the memory 110, the processor 120 may not acquire (or generate) complete response information only with the first user's speech. Accordingly, the processor 120 may acquire the second user's speech to supplement the first user's speech. When the second intention word included in the newly acquired second user's speech matches the intention word stored in the memory 110 and the second target word matches the target word stored in the memory 110, the processor 120 may acquire the complete response information based on the first user's speech and the second user's speech.

An example in which the first intention word does not match the intention word stored in the memory 110 and the first target word does not match the target word stored in the memory 110 will be described in greater detail below with reference to FIG. 15.

An example in which both the first intention word and first target word do not match the words stored in the memory 110 but the second intention word and the second target word match the words stored in the memory 110 will be described in greater detail below with reference to FIG. 16.

When the second intention word does not match the intention word stored in the memory 110, or the second target word does not match the target word stored in the memory 110, the processor 120 may acquire a UI including information notifying that the response information may not be acquired.

Because the second intention word and the second target word included in the second user's speech are not pre-stored in the memory 110, the processor 120 may not acquire the complete response information even in consideration of both the first user's speech and the second user's speech.

An example in which both the first intention word and the first target word do not match the words stored in the memory 110, and at least one of the second intention word or the second target word does not match the word stored in the memory 110 will be described in greater detail below with reference to FIGS. 17, 18, and 19.

The processor 120 may acquire the second intention word and the second target word from the second user's speech, acquire first similarity between the first intention word and the second intention word, acquire second similarity between the first target word and the second target word, and acquire third user's speech (or third user voice) received after the second user's speech when the first similarity is less than the threshold value or the second similarity is less than a second threshold value.

The processor 120 may acquire the second intention word and the second target word from the second user's speech using the word classification model. In addition, the processor 120 may acquire similarity between the first user's speech and the second user's speech. Specifically, the processor 120 may acquire first similarity between the intention words and acquire second similarity between the target words.

When the first similarity is less than the threshold value, the processor 120 may determine that the first user's speech and the second user's speech have low relevance, and acquire new user's speech. Example operations related thereto will be described in greater detail below with reference to operations S2040-N of FIG. 20, S2230-N of FIG. 22, and S2940-N of FIG. 29.

When the second similarity is less than the threshold value, the processor 120 may determine that the first user's speech and the second user's speech have low relevance, and acquire new user's speech. Example operations related thereto will be described in greater detail below with reference to operations S2140-N of FIG. 21, S2330-N of FIG. 23, and S3040-N of FIG. 30.

The electronic apparatus 100 according to various embodiments may provide a complete response to the user based on the first user's speech and the second user's speech. Because the electronic apparatus 100 provides the response by determining the relevance between a plurality of user's speeches, the accuracy of speech recognition may be improved.

In relation to the operation of determining the similarity, the first user's speech and the second user's speech may be compared in various ways. According to an embodiment, the similarity may be acquired by comparing the first user's speech and the second user's speech as a whole. According to an embodiment, the similarity may be acquired by comparing only the first intention word included in the first user's speech and the second intention word included in the second user's speech. According to an embodiment, the similarity may be acquired by comparing only the first target word included in the first user's speech and the second target word included in the second user's speech. According to an embodiment, both the similarity between the intention words included in the first user's speech and the second user's speech and the similarity between the intention words included in the first user's speech and the second user's speech may be acquired.

In relation to the operation of acquiring the response, the methods of using the first user's speech and the second user's speech may be different. According to an embodiment, the electronic apparatus 100 may select a portion of a necessary word from the first user's speech, select a portion of a necessary word from the second user's speech, and acquire a complete response by combining the selected words. According to an embodiment, the processor 120 may correct the first user's speech by acquiring words lacking in the first user's speech from the second user's speech, and acquire a complete response based on the corrected first user's speech.

Above, only a simple configuration of the electronic apparatus 100 is illustrated and described, but various configurations may be additionally provided at the time of implementation. This will be described by way of non-limiting example below with reference to FIG. 2.

Figure 2:
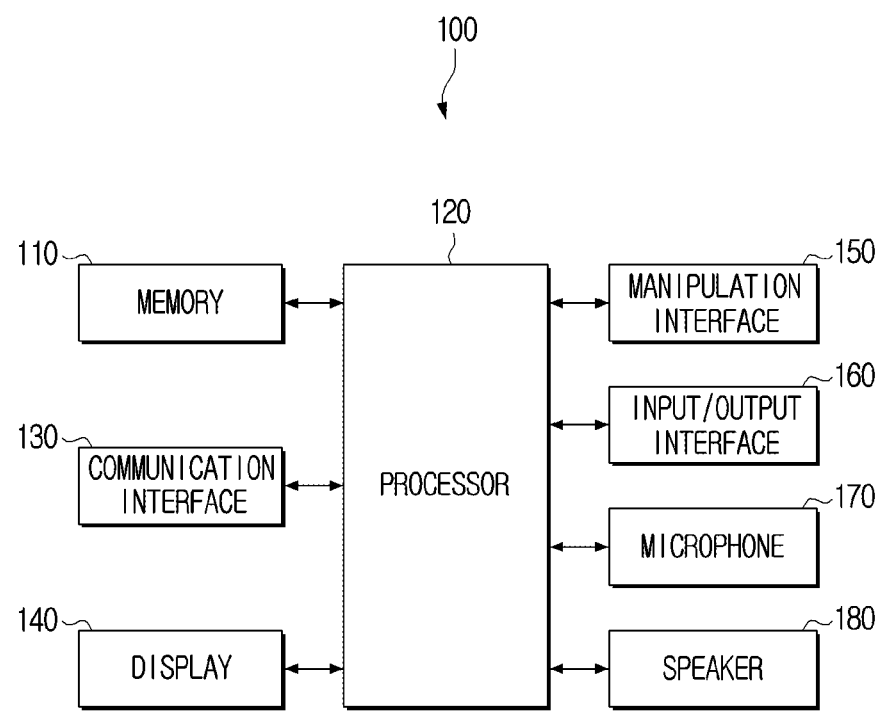
FIG. 2 is a block diagram illustrating an example configuration of the electronic apparatus of FIG. 1 according to various embodiments.

FIG. 2 is a block diagram illustrating an example configuration of the electronic apparatus 100 of FIG. 1 according to various embodiments.

Referring to FIG. 2, the electronic apparatus 100 may include at least one of the memory 110, the processor (e.g., including processing circuitry) 120, a communication interface (e.g., including communication circuitry) 130, a display 140, a manipulation interface (e.g., including interface circuitry) 150, an input/output interface (e.g., including input/output circuitry) 160, a microphone 170, and/or a speaker 180.

Redundant descriptions of the same operations as those described above among the operations of the memory 110 and the processor 120 may not be repeated.

The communication interface 130 may include various communication circuitry and is a component that performs communication with various types of external devices according to various types of communication methods. The communication interface 130 includes a Wi-Fi module, a Bluetooth module, an infrared communication module, a wireless communication module, and the like. Each communication module may be implemented in the form of at least one hardware chip including various communication circuitry.

The Wi-Fi module and the Bluetooth module included in the communication interface 130 may perform communication using a Wi-Fi method and a Bluetooth method, respectively. In case of using the Wi-Fi module or the Bluetooth module, various kinds of connection information such as a service set identifier (SSID), a session key, and the like are first transmitted and received to connect communication using the connection information, and various kinds of information may then be transmitted and received.

The infrared communication module performs communication according to an infrared data association (IrDA) technology that wirelessly transmits data at a short distance using infrared rays between visible light and millimeter wave.

The wireless communication module may include at least one communication chip including various communication circuitry that performs communication according to various wireless communication protocols such as Zigbee, 3rd generation (3G), 3rd generation partnership project (3GPP), Long Term Evolution (LTE), LTE Advanced (LET-A), 4th generation (4G), 5th generation (5G), and the like, in addition to the communication methods described above.

In addition, the communication interface 130 may include at least one of a local area network (LAN) module, an Ethernet module, or a wired communication module for performing communication using a pair cable, a coaxial cable, an optical fiber cable, an ultra wide-band (UWB) module, or the like.

According to an example, the communication interface 130 may use the same communication module (e.g., a Wi-Fi module) to communicate with an external device such as a remote controller and an external server.

According to another example, the communication interface 130 may use a different communication module to communicate with an external device such as a remote controller and an external server. For example, the communication interface 130 may use at least one of the Ethernet module or the Wi-Fi module to communicate with the external server, and may also use the Bluetooth module to communicate with the external device such as the remote controller. However, this is only an example and the communication interface 130 may use at least one communication module among various communication modules when communicating with a plurality of external devices or external servers.

The display 140 may be implemented as various types of displays such as, for example, and without limitation, a liquid crystal display (LCD), an organic light emitting diodes (OLED) display, a plasma display panel (PDP), and the like. The display 140 may also include a driving circuit, a backlight unit, and the like which may be implemented in the form of an a-si thin film transistor (TFT), a low temperature poly silicon (LTPS) TFT, and an organic TFT (OTFT). The display 140 may be implemented as a touch screen combined with a touch sensor, a flexible display, a three-dimensional (3D) display, and the like. In addition, according to an embodiment of the disclosure, the display 140 may include a bezel housing a display panel as well as the display panel that outputs an image. In particular, according to an embodiment of the disclosure, the bezel may include a touch sensor (not illustrated) for detecting user interaction.

The manipulation interface 150 may be include various manipulation circuitry including, for example, a device such as a button, a touch pad, a mouse, or a keyboard, or may also be implemented as a touch screen that may also perform the display function described above and a manipulation/input function. The button may be various types of buttons, such as mechanical buttons, touch pads, wheels, and the like, which are formed in arbitrary areas such as a front portion, a side portion, and a back portion of an exterior of a main body of the electronic apparatus 100.

The input/output interface 160 may include various input/output circuitry including, for example, and without limitation, any one interface of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), and a digital visual interface (DVI). The input/output interface 160 may input and output at least one of audio and video signals. According to an implementation example, the input/output interface 160 may include a port for inputting and outputting only the audio signal and a port for inputting and outputting only the video signal as separate ports, or may be implemented as one port for inputting and outputting both the audio signal and the video signal. The electronic apparatus 100 may transmit at least one of the audio and video signals to an external device (e.g., an external display device or an external speaker) through the input/output interface 160. Specifically, an output port included in the input/output interface 160 may be connected to the external device, and the electronic apparatus 100 may transmit at least one of the audio and video signals to the external device through the output port.

The microphone 170 is a component for receiving user's speech or other sounds and converting the user's speech or other sounds into audio data. The microphone 170 may receive the user's speech in an activated state. For example, the microphone 170 may be integrally formed on an upper side, or in a front direction, a side direction, or the like of the electronic apparatus 100. The microphone 170 may include various components such as a microphone for collecting user's speech in an analog form, an amplifier circuit for amplifying the collected user's speech, an A/D conversion circuit for sampling and converting the amplified user's speech into a digital signal, a filter circuit for removing noise components from the converted digital signal, and the like.

The speaker 180 may be a component that outputs not only various audio data processed by the input/output interface 160 but also various notification sounds or voice messages.

Figure 3:
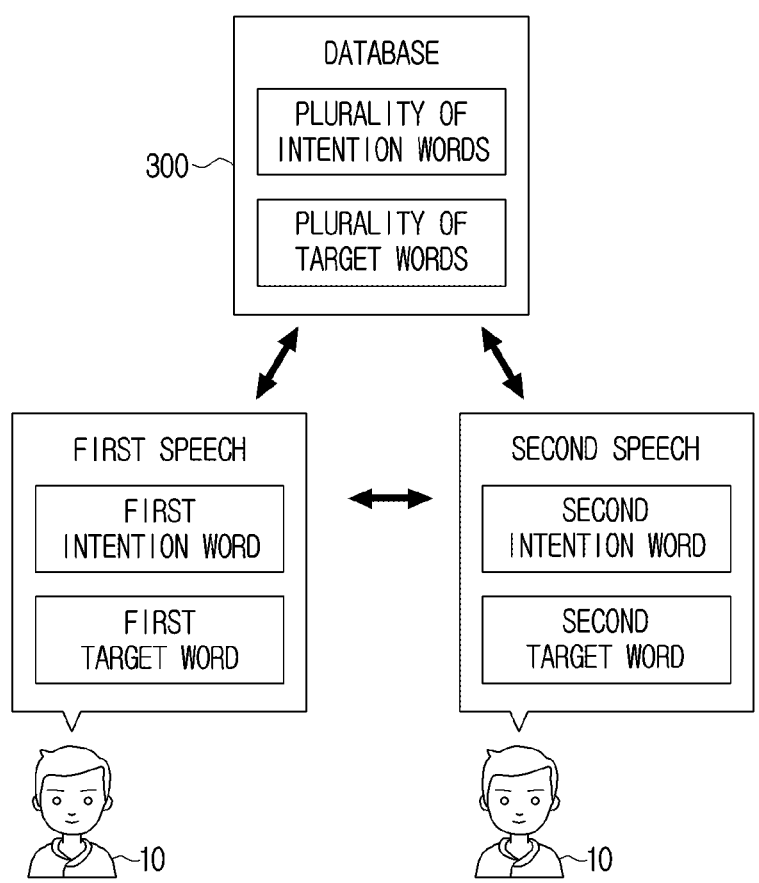
FIG. 3 is a diagram illustrating an example operation of comparing words included in first speech and second speech with words included in a database according to various embodiments.

FIG. 3 is a diagram illustrating an example operation of comparing words included in first speech and second speech with words included in a database according to various embodiments.

Referring to FIG. 3, according to an embodiment, the electronic apparatus 100 may include a database 300. As an example, the database 300 may be implemented as the memory 110. As another example, the database 300 may be hardware different from the memory 110. According to an embodiment, the database 300 is not included in the electronic apparatus 100 and may be implemented as a separate external server.

The database 300 may store a plurality intention words and a plurality of target words. The intention word may refer to a word related to a command for performing a specific function. The target word may be a word including detailed information required to perform a specific function. The database 300 may group and store target words corresponding to a specific intention word. For example, the database 300 may store various contacts required to perform a message transmission function. The intention word may be "message" and the target word may refer, for example, to "personal contact".

The electronic apparatus 100 may acquire first speech of a user 10 or second speech of the user 10. The speech of the same user 10 may be divided into the first speech and the second speech according to time sequence. When it is determined that the first speech is received but it is difficult to acquire a complete response only with the first speech, the electronic apparatus 100 may acquire the second speech.

The first speech may include at least one of a first intention word or a first target word. In addition, the second speech may include at least one of a second intention word or a second target word.

The electronic apparatus 100 may identify whether the word (at least one of the first intention word or the first target word) included in the first speech is pre-stored in the database 300. In addition, the electronic apparatus 100 may identify whether the word (at least one of the second intention word or the second target word) included in the second speech is pre-stored in the database 300.

Figure 4:
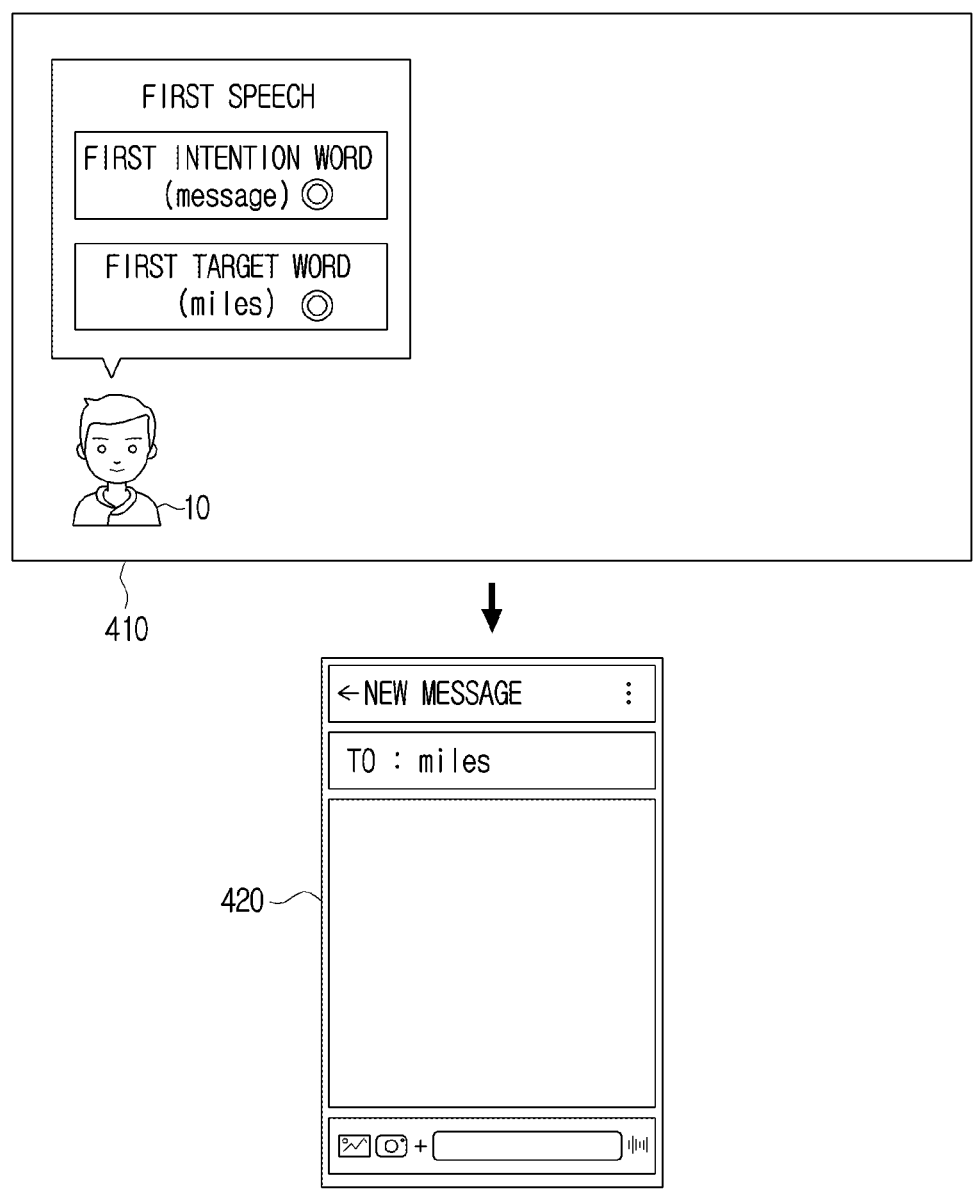
FIG. 4 is a diagram illustrating an example operation of the electronic apparatus performed according to various embodiments.

FIG. 4 is a diagram illustrating an example operation of the electronic apparatus 100 performed according to various embodiments.

Referring to FIG. 4, in an example 410, the electronic apparatus 100 may acquire first speech including a first intention word and a first target word. Both the first intention word and the first target word may be pre-stored words. For example, the first intention word may be "message" and the first target word may be "miles".

Here, "message" may be a command for transmitting a message. In addition, "miles" may be a person's name.

When both the first intention word and the first target word are pre-stored words, the electronic apparatus 100 may provide a complete response to the first speech. The electronic apparatus 100 may perform a function corresponding to speech recognition based on the first intention word and the first target word.

In an embodiment 410, the first intention word ("message") may be predefined, and the electronic apparatus 100 may execute an application for performing a function corresponding to the first intention word ("message"). The electronic apparatus 100 may generate and output a screen 420 on which the application is executed. The output may refer to an operation of displaying the generated screen 420 on the display 140 included in the electronic apparatus 100 or an operation of transmitting the generated screen 420 to an external device (not illustrated).

The screen 420 may include the first target word ("miles"). Specifically, the electronic apparatus 100 may perform an operation of applying the function corresponding to the first intention word ("message") to the first target word ("miles"). For example, the electronic apparatus 100 may output the screen 420 for transmitting a message to "miles".

Figure 5:
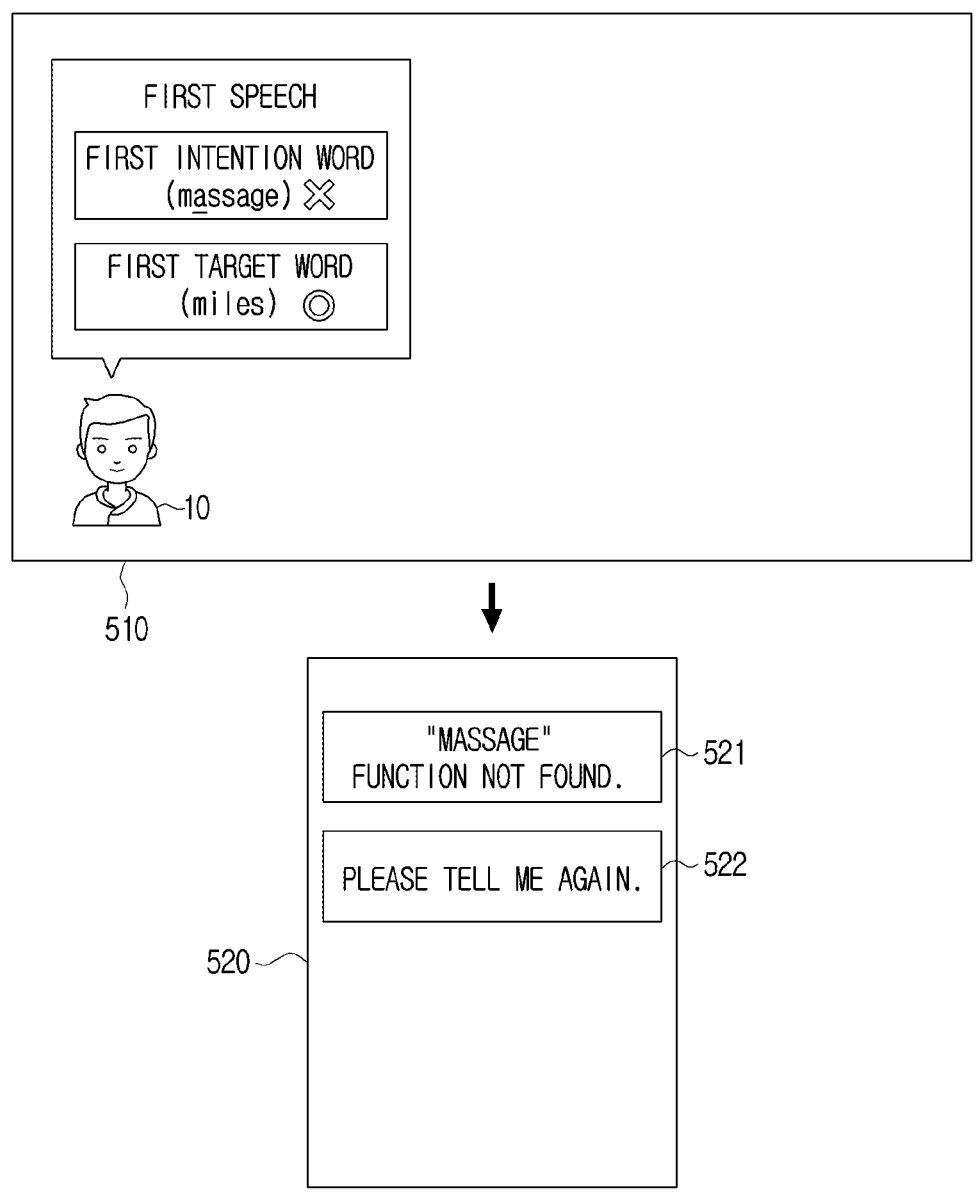
FIG. 5 is a diagram illustrating an example operation of the electronic apparatus performed according to various embodiments.

FIG. 5 is a diagram illustrating an example operation of the electronic apparatus 100 performed according to various embodiments.

Referring to FIG. 5, in an embodiment 510, the electronic apparatus 100 may acquire first speech including a first intention word and a first target word. The first intention word may be a word that is not pre-stored, and the first target word may be a pre-stored word. For example, the first intention word may be "massage" and the first target word may be "miles". Here, "massage" may be a word in which "message" is incorrectly recognized.

When the first intention word is not pre-stored, the electronic apparatus 100 may not provide a complete response.

When the first intention word that is not pre-stored is acquired, the electronic apparatus 100 may output at least one of first information 521 notifying that the complete response may not be provided or second information 522 requesting the user 10 to re-utter. Here, the output may refer to displaying image information through a display or reproducing audio information through a speaker.

The first information 521 may include content that the electronic apparatus 100 may not provide a complete response based on the first speech of the user 10. For example, the first information may include content notifying that a function corresponding to the first intention word ("massage") is not found (or may not be executed).

The second information 522 may include content that the electronic apparatus 100 requests the speech of the user 10 again to generate the complete response.

The electronic apparatus 100 may display a screen 520 including the first information 521 and the second information 522.

Figure 6:
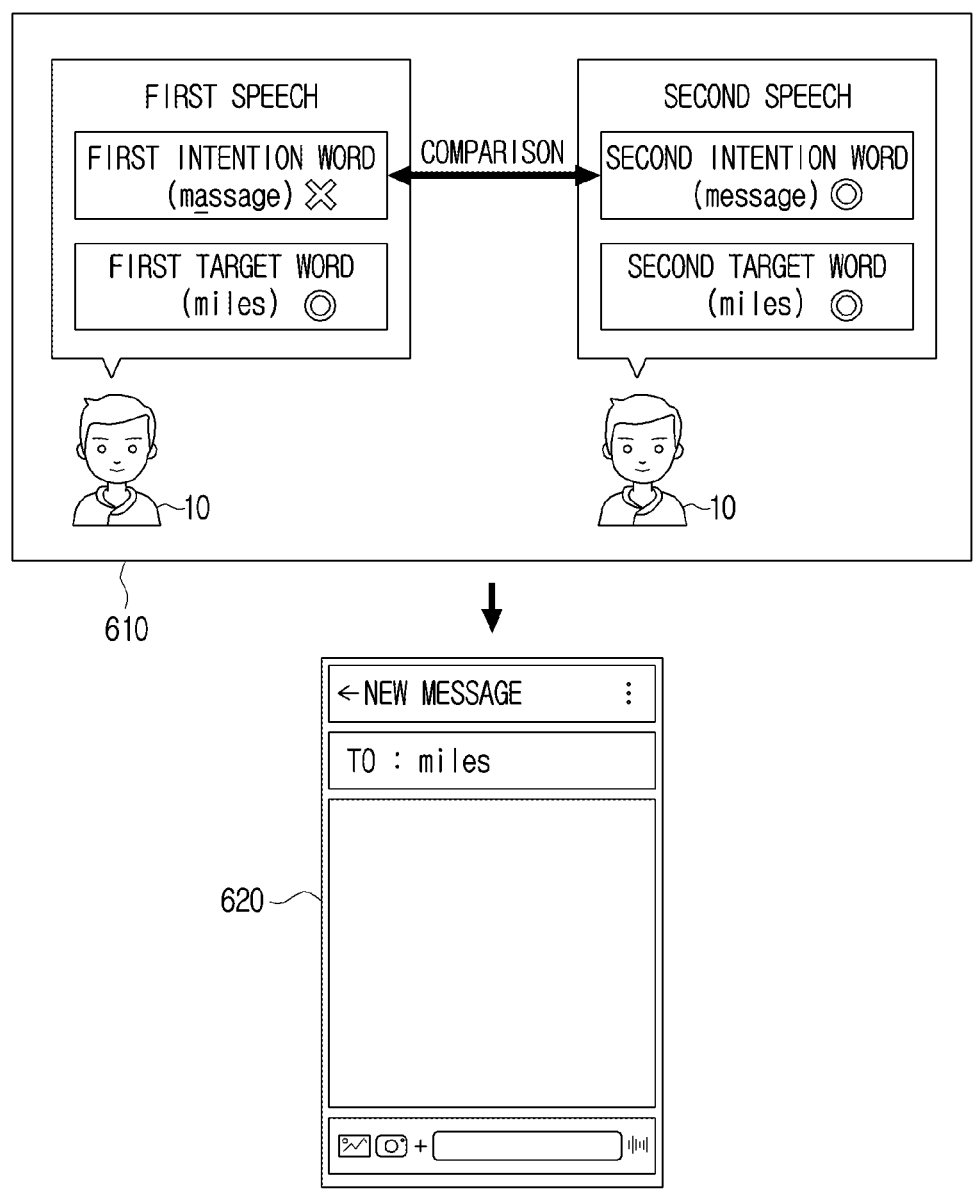
FIG. 6 is a diagram illustrating an example operation of the electronic apparatus when both a second intention word and a second target word of the second speech are pre-stored words according to various embodiments.

FIG. 6 is a diagram illustrating an example operation of the electronic apparatus 100 when both a second intention word and a second target word of second speech are pre-stored words according to various embodiments.

Referring to FIG. 6, in an embodiment 610, the electronic apparatus 100 may additionally acquire second speech of the user 10 including a second intention word and a second target word after acquiring the first speech of the embodiment 510 of FIG. 5. Both the second intention word and the second target word may be pre-stored words. For example, the second intention word may be "message" and the second target word may be "miles".

The electronic apparatus 100 may acquire the second speech re-uttered by the user 10. The second speech may be speech for the purpose of supplementing the first speech that may not provide the complete response.

When both the second intention word and the second target word included in the second speech are pre-stored words, the electronic apparatus 100 may identify that the complete response may be provided based on the second speech.

The electronic apparatus 100 may compare the first speech with the second speech before providing the complete response based on the second speech. For example, the electronic apparatus 100 may acquire similarity between the first intention word and the second intention word, and identify whether the acquired similarity is a threshold value or more. A reason for acquiring the similarity is to reconfirm whether the first speech and the second speech are related. If the first speech and the second speech are completely different speeches, the same command may not be determined from the first speech and the second speech. Accordingly, the electronic apparatus 100 may provide the complete response only when it is determined that there is a correlation by comparing the first speech and the second speech.

For example, in the embodiment 610, if the second intention word included in the second speech is pre-stored, the electronic apparatus 100 may acquire similarity between the first intention word and the second intention word. In addition, the electronic apparatus 100 may identify whether the acquired similarity is a threshold value or more. If the similarity is the threshold value or more, the electronic apparatus 100 may acquire a complete response based on the first speech and the second speech. For example, the electronic apparatus 100 may provide the complete response based on the second intention word and the first target word.

For example, in the embodiment 610, if the second intention word ("message") is pre-stored, the electronic apparatus 100 may execute an application for performing a function corresponding to the second intention word ("message"). Then, the electronic apparatus 100 may generate and output a screen 620 on which the application is executed. The output may refer to an operation of displaying the generated screen 620 on the display 140 included in the electronic apparatus 100 or an operation of transmitting the generated screen 620 to an external device (not illustrated).

The screen 620 may include the first target word ("miles"). For example, the electronic apparatus 100 may perform an operation of applying the function corresponding to the second intention word ("message") to the first target word ("miles"). For example, the electronic apparatus 100 may output the screen 620 for transmitting a message to "miles".

Figure 7:
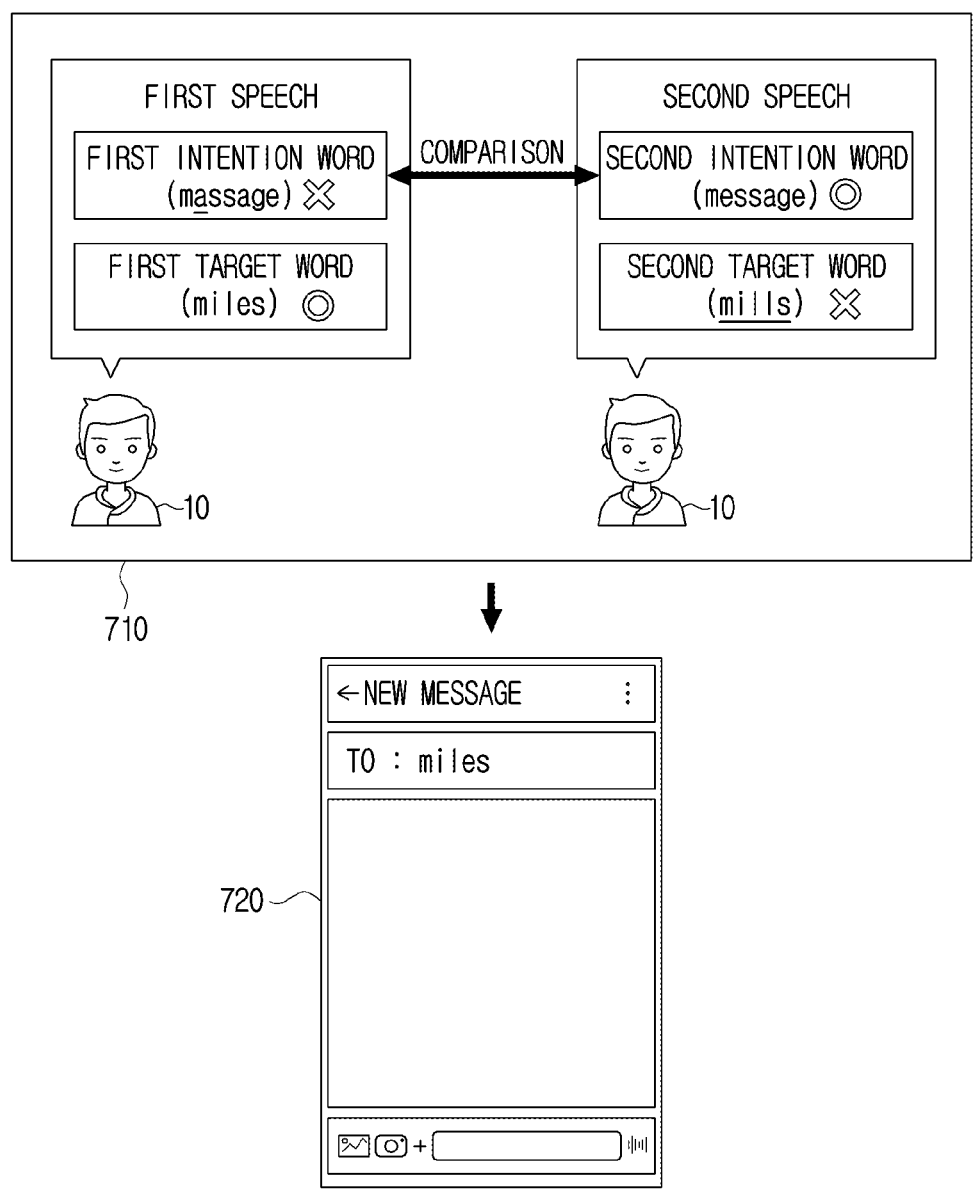
FIG. 7 is a diagram illustrating an example operation of the electronic apparatus when only the second intention word of the second speech is the pre-stored word according to various embodiments.

FIG. 7 is a diagram illustrating an example operation of the electronic apparatus 100 when only the second intention word of the second speech is the pre-stored word according to various embodiments.

Referring to FIG. 7, in an embodiment 710, the electronic apparatus 100 may additionally acquire second speech of the user 10 including a second intention word and a second target word after acquiring the first speech of the embodiment 510 of FIG. 5. The second intention word may be a pre-stored word and the second target word may not be a pre-stored word. For example, the second intention word may be "message" and the second target word may be "mills".

The second speech may be speech for supplementing the first speech. Accordingly, the electronic apparatus 100 may acquire, from the second speech, a portion insufficient to provide the complete response from the first speech. The reason that the first speech may not provide the complete response in the embodiment 510 of FIG. 5 is that the first intention word is not pre-stored. Accordingly, the electronic apparatus 100 may already clearly recognize the target word. The electronic apparatus 100 may check only whether the second intention word is pre-stored. Because the first target word has already been clearly selected (recognized) from the first speech, the electronic apparatus 100 may not need to check whether the second target word of the second speech is pre-stored.

For example, in the embodiment 710, if the second intention word included in the second speech is pre-stored, the electronic apparatus 100 may acquire similarity between the first intention word and the second intention word. In addition, the electronic apparatus 100 may identify whether the acquired similarity is a threshold value or more. If the similarity is the threshold value or more, the electronic apparatus 100 may acquire a complete response based on the first speech and the second speech. Specifically, the electronic apparatus 100 may provide the complete response based on the second intention word and the first target word.

For example, in the embodiment 710, if the second intention word ("message") is pre-stored, the electronic apparatus 100 may execute an application for performing a function corresponding to the second intention word ("message"). Then, the electronic apparatus 100 may generate and output a screen 720 on which the application is executed. The output may refer to an operation of displaying the generated screen 720 on the display 140 included in the electronic apparatus 100 or an operation of transmitting the generated screen 720 to an external device (not illustrated).

The screen 720 may include the first target word ("miles"). For example, the electronic apparatus 100 may perform an operation of applying the function corresponding to the second intention word ("message") to the first target word ("miles"). For example, the electronic apparatus 100 may output the screen 720 for transmitting a message to "miles".

Figure 8:
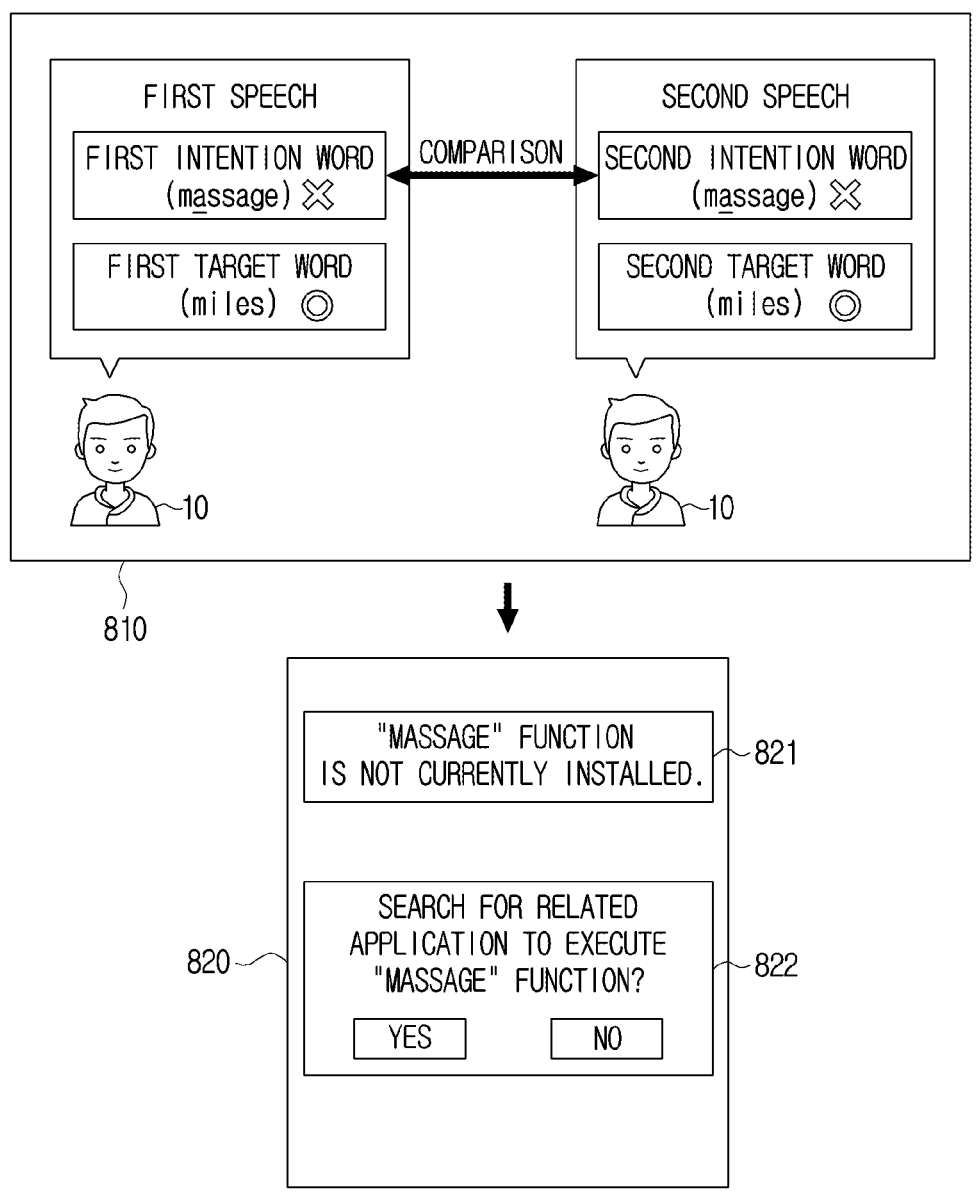
FIG. 8 is a diagram illustrating an example operation of the electronic apparatus when only the second target word of the second speech is the pre-stored word according to various embodiments.

FIG. 8 is a diagram illustrating an example operation of the electronic apparatus 100 when only the second target word of the second speech is the pre-stored word according to various embodiments.

Referring to FIG. 8, in an embodiment 810, the electronic apparatus 100 may additionally acquire second speech of the user 10 including a second intention word and a second target word after acquiring the first speech of the embodiment 510 of FIG. 5. The second intention word may not be a pre-stored word and the second target word may be a pre-stored word. For example, the second intention word may be "massage" and the second target word may be "miles".

When the second intention word is not pre-stored, the electronic apparatus 100 may not provide a complete response.

When the second intention word that is not pre-stored is acquired, the electronic apparatus 100 may output at least one of third information 821 notifying that the complete response may not be provided or fourth information 822 of querying a subsequent operation for providing the complete response. The output may refer to displaying image information through a display or reproducing audio information through a speaker.

The third information 821 may include content that the electronic apparatus 100 may not provide a complete response based on the first speech and the second speech of the user 10. For example, the third information may include content notifying that a function corresponding to the first intention word ("massage") and the second intention word ("massage") is not found (or may not be executed).

The purpose of the third information 821 may be the same as or similar to that of the first information 521 described in FIG. 5 in that the third information 821 notifies that the complete response is not provided.

The fourth information 822 may include content of querying to the user 10 whether to download an application for executing the function corresponding to the second intention word. For example, the fourth information may include content of querying whether to search for an application related to the function corresponding to the second intention word ("massage") from an external server.

The electronic apparatus 100 may display a screen 820 including the third information 821 and the fourth information 822.

Figure 9:
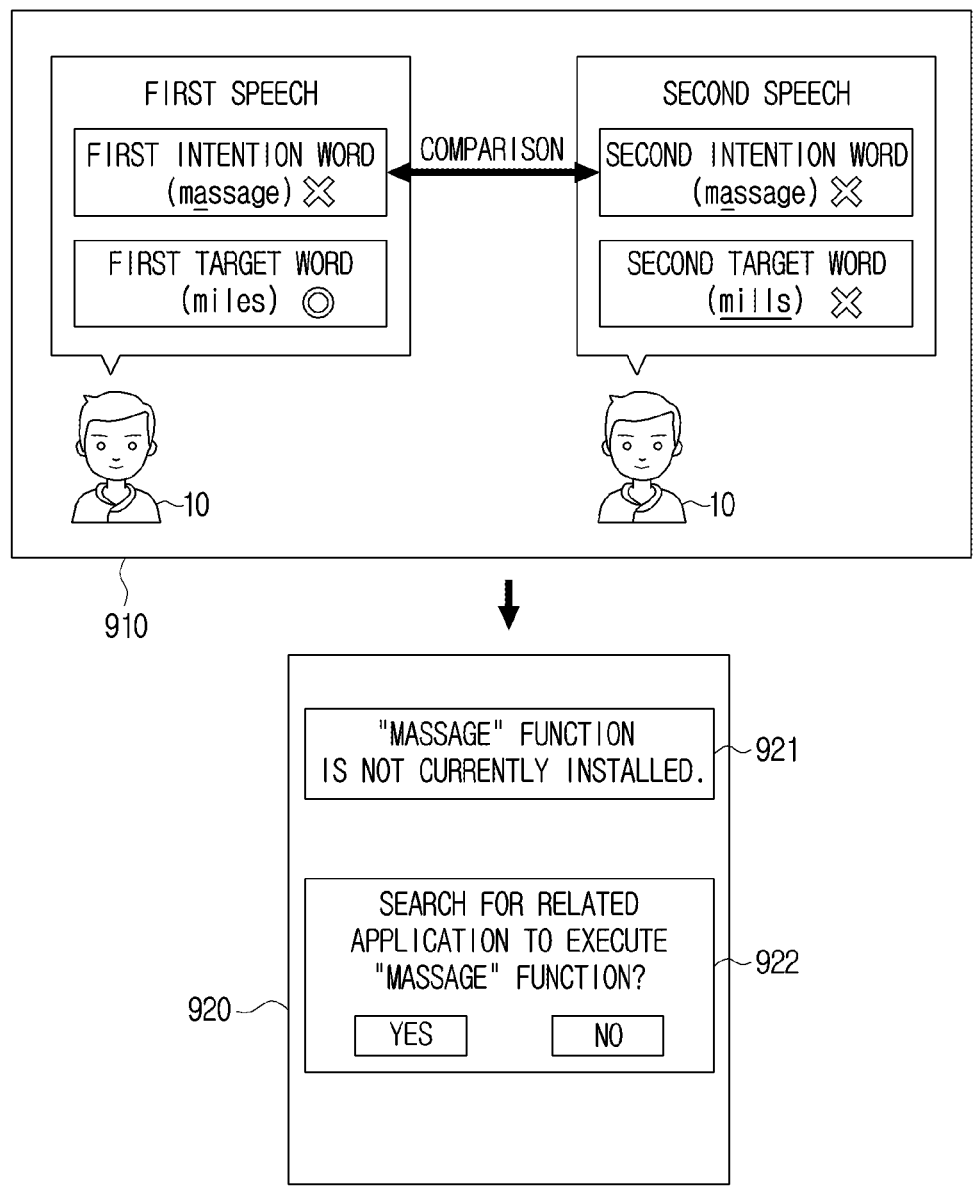
FIG. 9 is a diagram illustrating an example operation of the electronic apparatus when the pre-stored words are not included in the second speech according to various embodiments.

FIG. 9 is a diagram illustrating an example operation of the electronic apparatus 100 when the pre-stored words are not included in the second speech according to various embodiments.

Referring to FIG. 9, in an embodiment 910, the electronic apparatus 100 may additionally acquire second speech of the user 10 including a second intention word and a second target word after acquiring the first speech of the embodiment 510 of FIG. 5. The second intention word and the second target word may not be pre-stored words. For example, the second intention word may be "massage" and the second target word may be "mills".

When the second intention word is not pre-stored, the electronic apparatus 100 may not provide a complete response.

When the second intention word is not pre-stored, the electronic apparatus 100 may perform the same or similar operation as that in the embodiment 810 of FIG. 8. Unlike the embodiment 910 of FIG. 9, in the embodiment 810 of FIG. 8, the second target word ("miles") is pre-stored, but the electronic apparatus 100 may not perform a specific function only with the second target word ("miles"). Therefore, when the second intention word that is not pre-stored is acquired regardless of whether the second target word ("miles") is pre-stored, the electronic apparatus 100 may output at least one of third information 921 notifying that the complete response may not be provided or fourth information 922 of querying a subsequent operation for providing the complete response.

The electronic apparatus 100 may display a screen 920 including the third information 921 and the fourth information 922.

Figure 10:
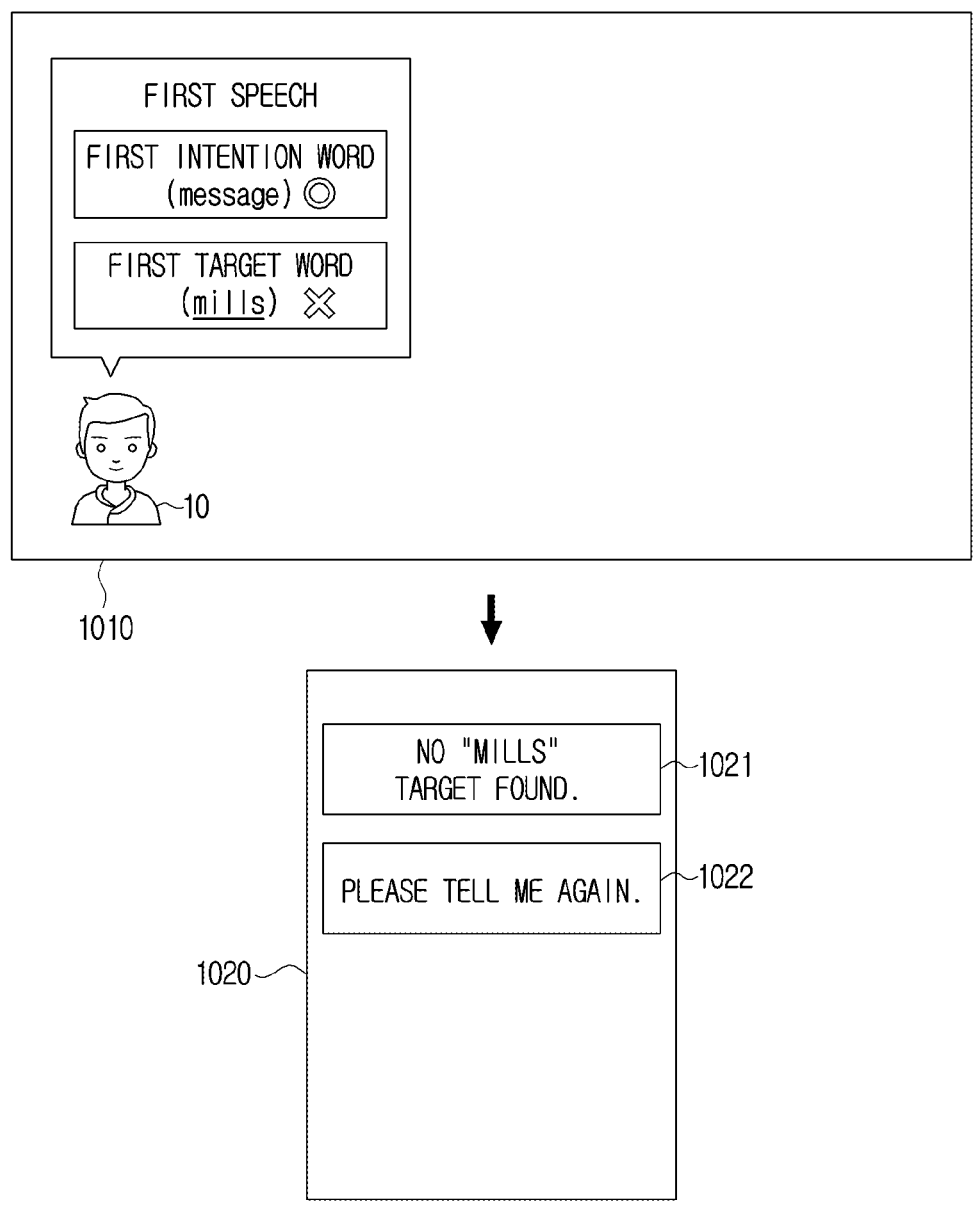
FIG. 10 is a diagram illustrating an example operation of the electronic apparatus performed according to various embodiments.

FIG. 10 is a diagram illustrating an example operation of the electronic apparatus 100 performed according to various embodiments.

Referring to FIG. 10, in an embodiment 1010, the electronic apparatus 100 may acquire first speech including a first intention word and a first target word. The first intention word may be a pre-stored word and the first target word may not be a pre-stored word. For example, the first intention word may be "message" and the first target word may be "miles". Here, "mills" may be a word in which "miles" is incorrectly recognized.

When the first target word is not pre-stored, the electronic apparatus 100 may not provide a complete response.

When the first target word that is not pre-stored is acquired, the electronic apparatus 100 may output at least one of first information 1021 notifying that the complete response may not be provided or second information 1022 requesting the user 10 to re-utter. The output may refer to displaying image information through a display or reproducing audio information through a speaker.

The first information 1021 may include content that the electronic apparatus 100 may not provide a complete response based on the first speech of the user 10. For example, the first information may include content that the first target word ("mills") may not be found.

The second information 1022 may include content that the electronic apparatus 100 requests the speech of the user 10 again to generate the complete response.

The electronic apparatus 100 may display a screen 1020 including the first information 1021 and the second information 1022.

Figure 11:
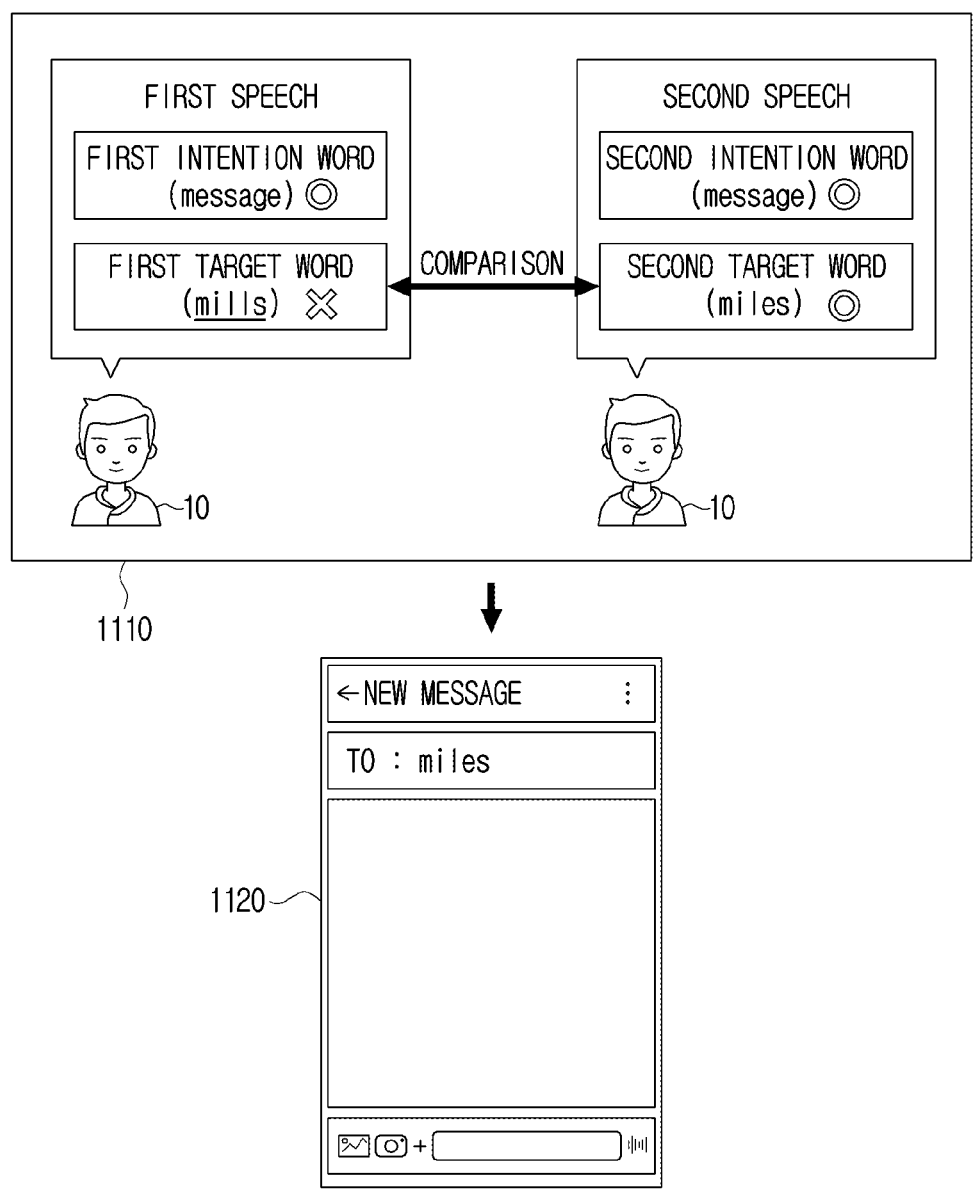
FIG. 11 is a diagram illustrating an example operation of the electronic apparatus when both a second intention word and a second target word of the second speech are pre-stored words according to various embodiments.

FIG. 11 is a diagram illustrating an example operation of the electronic apparatus 100 when both a second intention word and a second target word of second speech are pre-stored words according to various embodiments.

Referring to FIG. 11, in an embodiment 1110, the electronic apparatus 100 may additionally acquire second speech of the user 10 including a second intention word and a second target word after acquiring the first speech of the embodiment 1010 of FIG. 10. Both the second intention word and the second target word may be pre-stored words. For example, the second intention word may be "message" and the second target word may be "miles".

The electronic apparatus 100 may acquire the second speech re-uttered by the user 10. The second speech may be speech for the purpose of supplementing the first speech that may not provide the complete response.

When both the second intention word and the second target word included in the second speech are pre-stored words, the electronic apparatus 100 may identify that the complete response may be provided based on the second speech.

The electronic apparatus 100 may compare the first speech with the second speech before providing the complete response based on the second speech. For example, the electronic apparatus 100 may acquire similarity between the first target word and the second target word, and identify whether the acquired similarity is a threshold value or more. A reason for acquiring the similarity is to reconfirm whether the first speech and the second speech are related. If the first speech and the second speech are completely different speeches, the same command may not be determined from the first speech and the second speech. Accordingly, the electronic apparatus 100 may provide the complete response only when it is determined that there is a correlation by comparing the first speech and the second speech.

For example, in the embodiment 1110, if the second target word included in the second speech is pre-stored, the electronic apparatus 100 may acquire similarity between the first target word and the second target word. In addition, the electronic apparatus 100 may identify whether the acquired similarity is a threshold value or more. If the similarity is the threshold value or more, the electronic apparatus 100 may acquire a complete response based on the first speech and the second speech. For example, the electronic apparatus 100 may provide the complete response based on the first intention word and the second target word.

For example, in the embodiment 1110, if the first intention word ("message") is pre-stored, the electronic apparatus 100 may execute an application for performing a function corresponding to the first intention word ("message"). Then, the electronic apparatus 100 may generate and output a screen 1120 on which the application is executed. The output may refer to an operation of displaying the generated screen 1120 on the display 140 included in the electronic apparatus 100 or an operation of transmitting the generated screen 1120 to an external device (not illustrated).

The screen 1120 may include the second target word ("miles"). For example, the electronic apparatus 100 may perform an operation of applying the function corresponding to the first intention word ("message") to the second target word ("miles"). For example, the electronic apparatus 100 may output the screen 1120 for transmitting a message to "miles".

Figure 12:
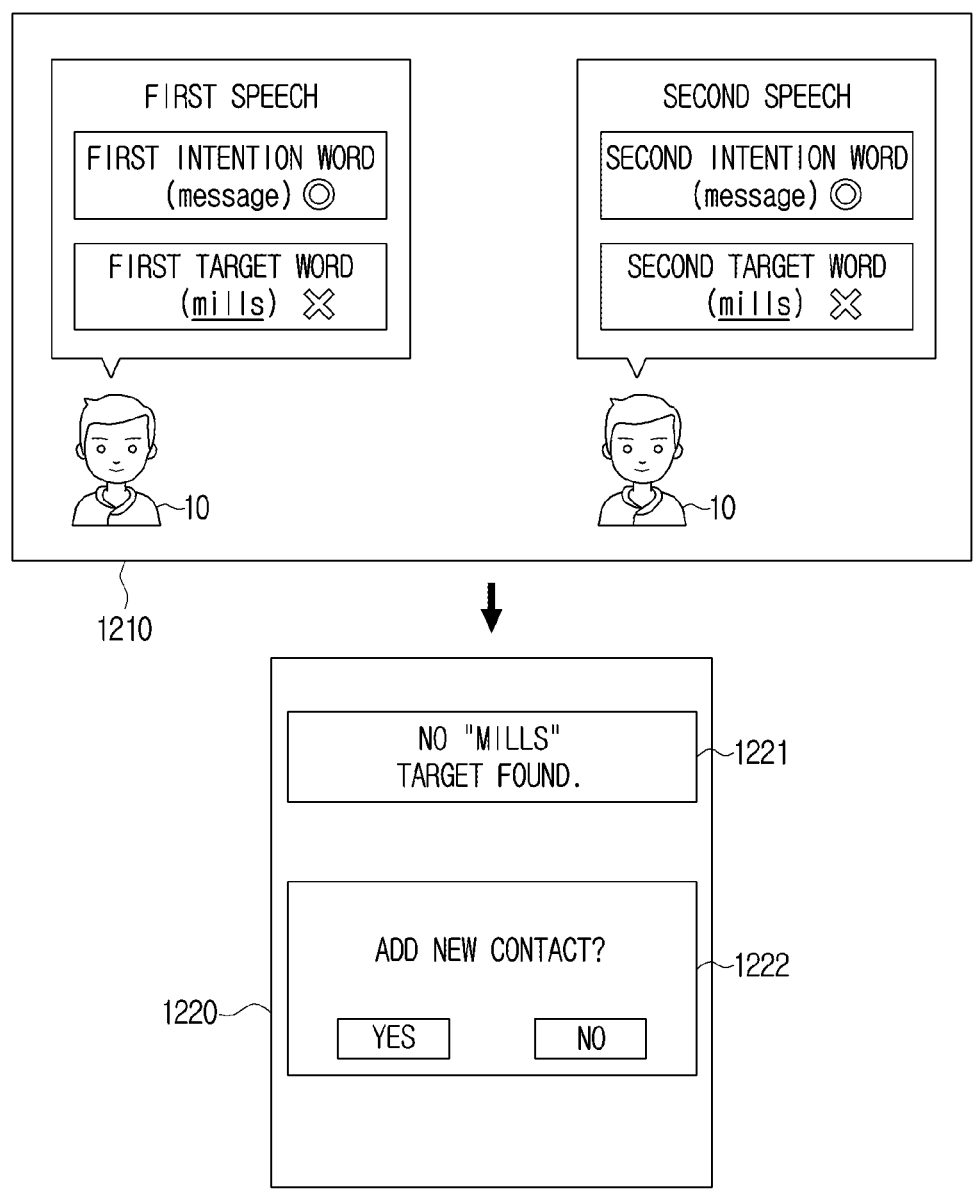
FIG. 12 is a diagram illustrating an example operation of the electronic apparatus when only the second intention word of the second speech is the pre-stored word according to various embodiments.

FIG. 12 is a diagram illustrating an example operation of the electronic apparatus 100 when only the second intention word of the second speech is the pre-stored word according to various embodiments.

Referring to FIG. 12, in an embodiment 1210, the electronic apparatus 100 may additionally acquire second speech of the user 10 including a second intention word and a second target word after acquiring the first speech of the embodiment 1010 of FIG. 10. The second intention word may be a pre-stored word and the second target word may not be a pre-stored word. For example, the second intention word may be "message" and the second target word may be "mills".

When the second target word is not pre-stored, the electronic apparatus 100 may not provide a complete response.

When the second target word that is not pre-stored is acquired, the electronic apparatus 100 may output at least one of third information 1221 notifying that the complete response may not be provided or fourth information 1222 of querying a subsequent operation for providing the complete response. The output may refer to displaying image information through a display or reproducing audio information through a speaker.

The third information 1221 may include content that the electronic apparatus 100 may not provide a complete response based on the first speech and the second speech of the user 10. For example, the first information may include content that the first target word ("mills") and the second target word ("mills") may not be found.

The purpose of the third information 1221 may be the same as or similar to that of the first information 1021 described in FIG. 10 in that the third information 1221 notifies that the complete response is not provided.

The fourth information 1222 may include content of querying whether to perform an operation for storing the second target word. For example, the fourth information may include content of querying whether to store (or add) the second target word ("mills") as a new contact.

The electronic apparatus 100 may display a screen 1220 including the third information 1221 and the fourth information 1222.

Figure 13:
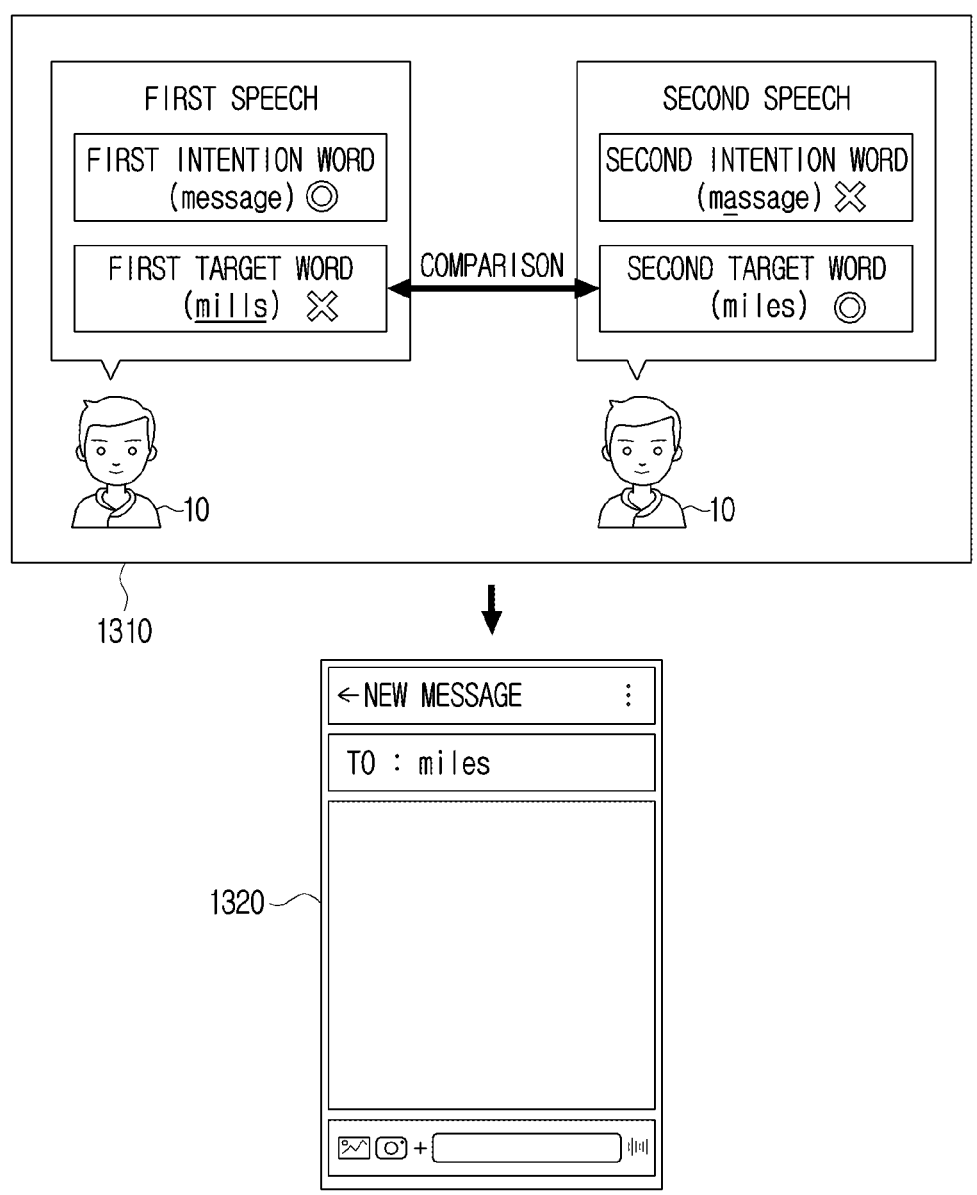
FIG. 13 is a diagram illustrating an example operation of the electronic apparatus when only the second target word of the second speech is the pre-stored word according to the third embodiment.

FIG. 13 is a diagram illustrating an example operation of the electronic apparatus 100 when only the second target word of the second speech is the pre-stored word according to various embodiments.

Referring to FIG. 13, in an embodiment 1310, the electronic apparatus 100 may additionally acquire second speech of the user 10 including a second intention word and a second target word after acquiring the first speech of the embodiment 1010 of FIG. 10. The second intention word may not be a pre-stored word and the second target word may be a pre-stored word. For example, the second intention word may be "massage" and the second target word may be "miles".

The second speech may be speech for supplementing the first speech. Accordingly, the electronic apparatus 100 may acquire, from the second speech, a portion insufficient to provide the complete response from the first speech. The reason that the first speech may not provide the complete response in the embodiment 1010 of FIG. 10 is that the first target word is not pre-stored. Accordingly, the electronic apparatus 100 may already clearly recognize the intention word. The electronic apparatus 100 may check only whether the second target word is pre-stored. Because the first intention word has already been clearly selected (recognized) from the first speech, the electronic apparatus 100 may not need to check whether the second intention word of the second speech is pre-stored.

For example, in the embodiment 1310, if the second target word included in the second speech is pre-stored, the electronic apparatus 100 may acquire similarity between the first target word and the second target word. In addition, the electronic apparatus 100 may identify whether the acquired similarity is a threshold value or more. If the similarity is the threshold value or more, the electronic apparatus 100 may acquire a complete response based on the first speech and the second speech. For example, the electronic apparatus 100 may provide the complete response based on the first intention word and the second target word.

For example, in the embodiment 1310, if the first intention word ("message") is pre-stored, the electronic apparatus 100 may execute an application for performing a function corresponding to the first intention word ("message"). Then, the electronic apparatus 100 may generate and output a screen 1320 on which the application is executed. Here, the output may refer to an operation of displaying the generated screen 1320 on the display 140 included in the electronic apparatus 100 or an operation of transmitting the generated screen 1320 to an external device (not illustrated).

The screen 1320 may include the second target word ("miles"). For example, the electronic apparatus 100 may perform an operation of applying the function corresponding to the first intended word ("message") to the second target word ("miles"). For example, the electronic apparatus 100 may output the screen 1320 for transmitting a message to "miles".

Figure 14:
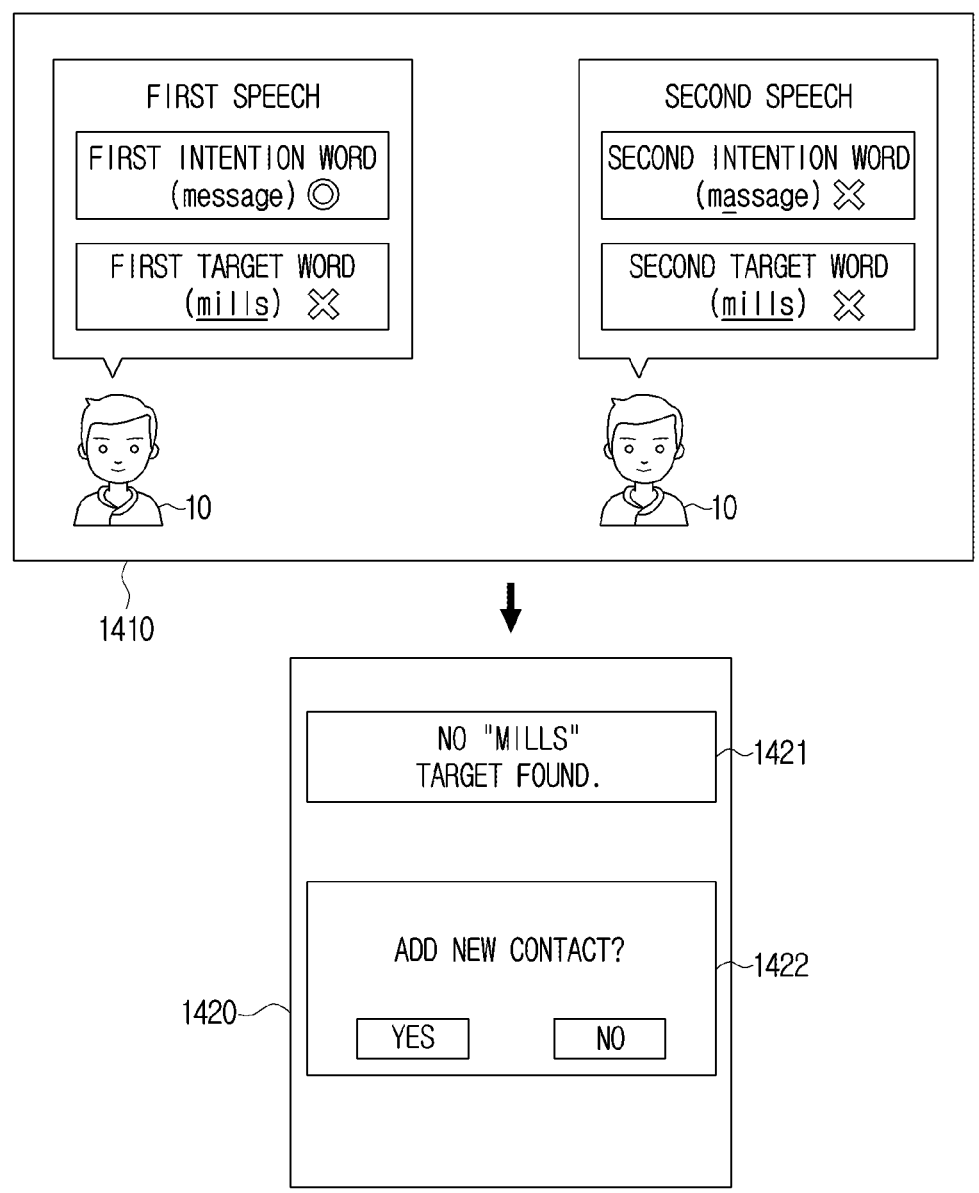
FIG. 14 is a diagram illustrating an example operation of the electronic apparatus when the pre-stored words are not included in the second speech according to various embodiments.

FIG. 14 is a diagram illustrating an example operation of the electronic apparatus 100 when the pre-stored words are not included in the second speech according to various embodiments.

Referring to FIG. 14, in an embodiment 1410, the electronic apparatus 100 may additionally acquire second speech of the user 10 including a second intention word and a second target word after acquiring the first speech of the embodiment 1010 of FIG. 10. The second intention word and the second target word may not be pre-stored words. For example, the second intention word may be "massage" and the second target word may be "mills".

When the second target word is not pre-stored, the electronic apparatus 100 may not provide a complete response.

When the second target word is not pre-stored, the electronic apparatus 100 may perform the same or similar operation as that in the embodiment 1210 of FIG. 12. Unlike the embodiment 1410 of FIG. 14, in the embodiment 1210 of FIG. 12, the second intention word ("message") is pre-stored, but the electronic apparatus 100 may not perform a specific function only with the second intention word ("message"). Therefore, when the second target word that is not pre-stored is acquired regardless of whether the second intention word ("message") is pre-stored, the electronic apparatus 100 may output at least one of third information 1421 notifying that the complete response may not be provided or fourth information 1422 of querying a subsequent operation for providing the complete response.

The electronic apparatus 100 may display a screen 1420 including the third information 1421 and the fourth information 1422.

Figure 15:
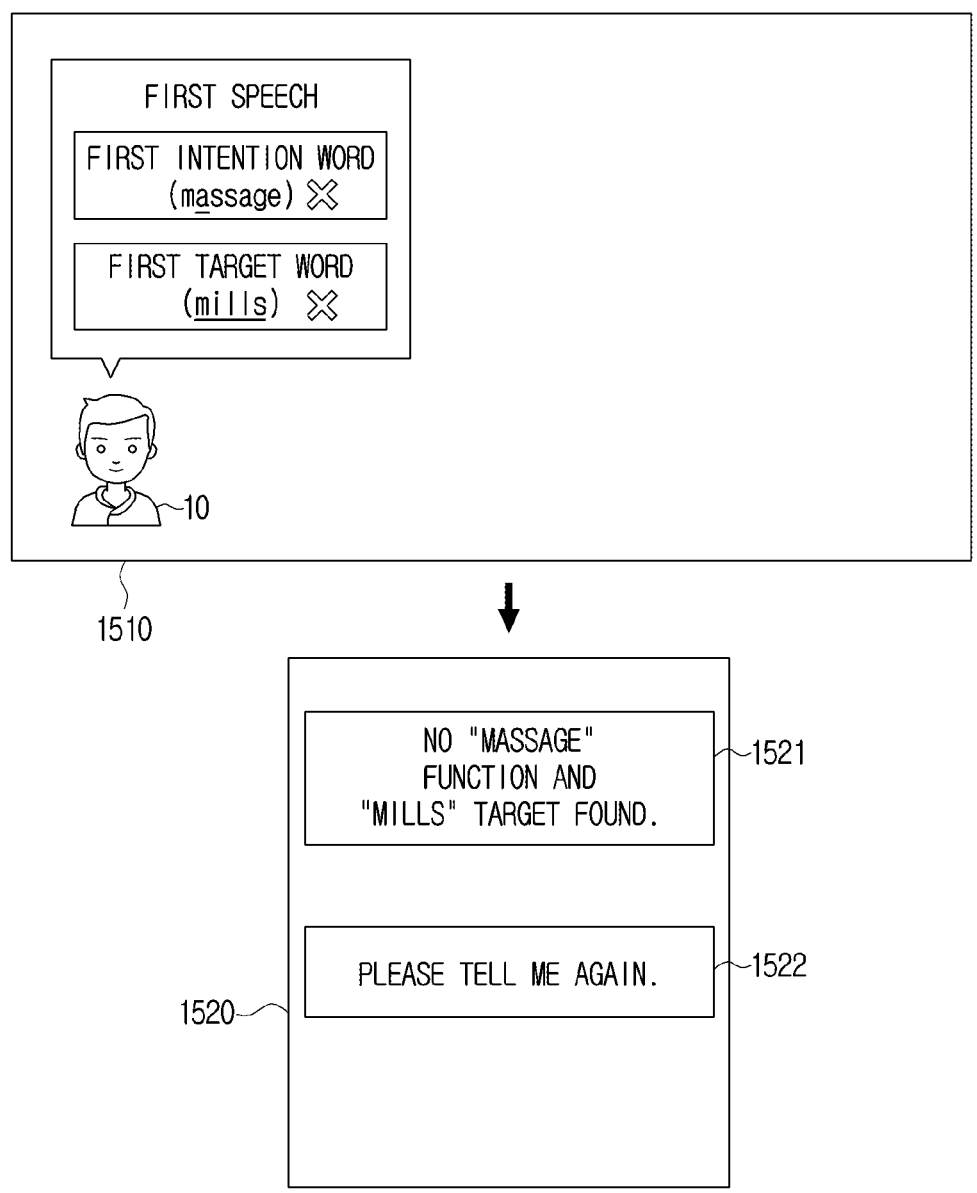
FIG. 15 is a diagram illustrating an example operation of the electronic apparatus performed according to various embodiments.

FIG. 15 is a diagram illustrating an example operation of the electronic apparatus 100 performed according to various embodiments.

Referring to FIG. 15, in an embodiment 1510, the electronic apparatus 100 may acquire first speech including a first intention word and a first target word. Both the first intention word and the first target word may not be pre-stored words. For example, the first intention word may be "massage" and the first target word may be "mills". Here, "massage" may be a word in which "message" is incorrectly recognized. Here, "mills" may be a word in which "miles" is incorrectly recognized.

When the first intention word and the first target word are not pre-stored, the electronic apparatus 100 may not provide a complete response.

When the first intention word and the first target word that are not pre-stored are acquired, the electronic apparatus 100 may output at least one of first information 1521 notifying that the complete response may not be provided or second information 1522 requesting the user 10 to re-utter. Here, the output may refer to displaying image information through a display or reproducing audio information through a speaker.

The first information 1521 may include content that the electronic apparatus 100 may not provide a complete response based on the first speech of the user 10. For example, the first information may include content notifying that a function corresponding to the first intention word ("massage") and the first target word ("mills") are not found (or may not be executed).

The second information 1522 may include content that the electronic apparatus 100 requests the speech of the user 10 again to generate the complete response.

The electronic apparatus 100 may display a screen 1520 including the first information 1521 and the second information 1522.

Figure 16:
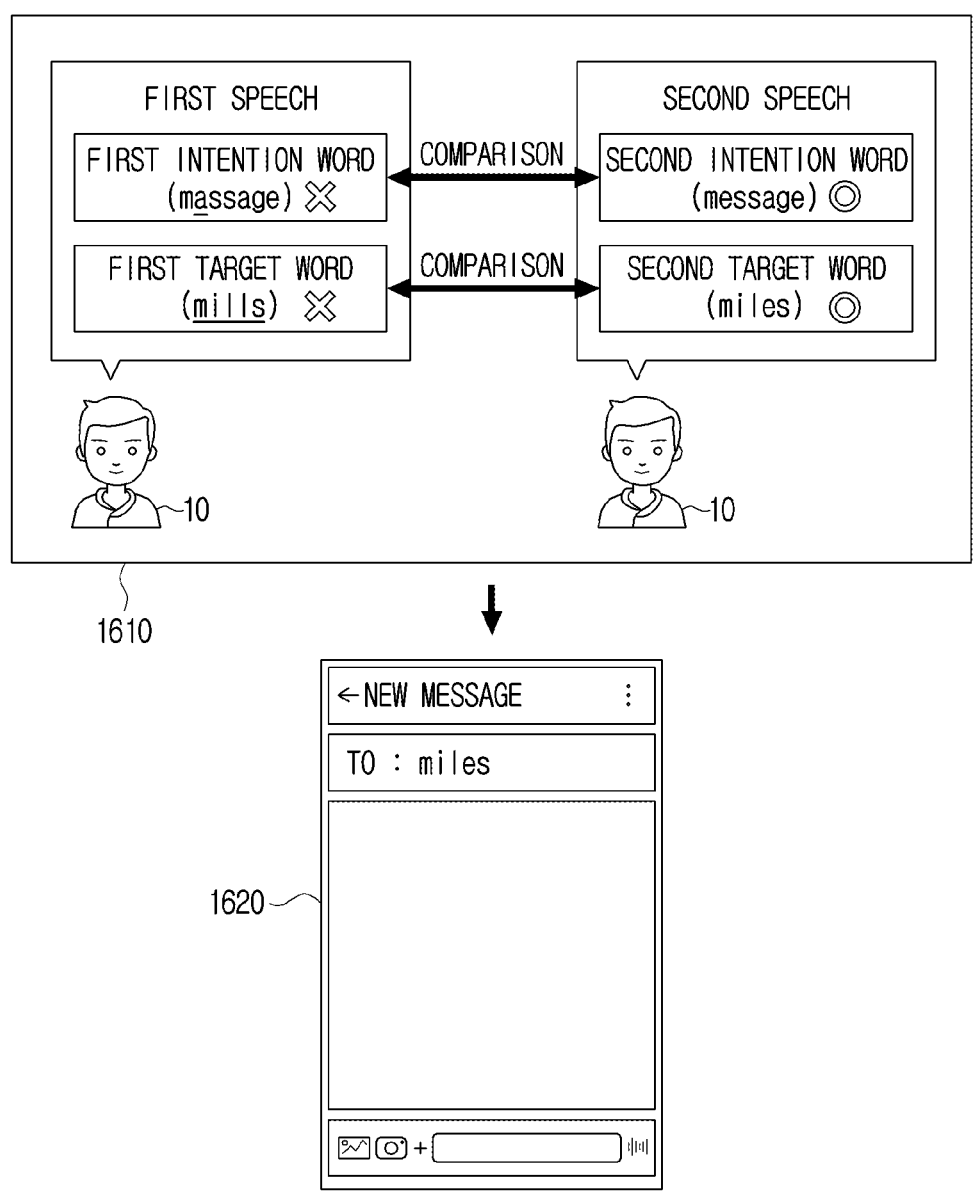
FIG. 16 is a diagram illustrating an example operation of the electronic apparatus when both a second intention word and a second target word of the second speech are pre-stored words according to various embodiments.

FIG. 16 is a diagram illustrating an example operation of the electronic apparatus 100 when both a second intention word and a second target word of second speech are pre-stored words according to various embodiments.

Referring to FIG. 16, in an embodiment 1610, the electronic apparatus 100 may additionally acquire second speech of the user 10 including a second intention word and a second target word after acquiring the first speech of the embodiment 1510 of FIG. 15. Both the second intention word and the second target word may be pre-stored words. For example, the second intention word may be "message" and the second target word may be "miles".

The electronic apparatus 100 may acquire the second speech re-uttered by the user 10. Here, the second speech may be speech for the purpose of supplementing the first speech that may not provide the complete response.

When both the second intention word and the second target word included in the second speech are pre-stored words, the electronic apparatus 100 may identify that the complete response may be provided based on the second speech.

The electronic apparatus 100 may compare the first speech with the second speech before providing the complete response based on the second speech. Specifically, the electronic apparatus 100 may acquire first similarity between the first intention word and the second intention word, and acquire second similarity between the first target word and the second target word.

A reason for acquiring the similarity is to reconfirm whether the first speech and the second speech are related. If the first speech and the second speech are completely different speeches, the same command may not be determined from the first speech and the second speech. Accordingly, the electronic apparatus 100 may provide the complete response only when it is determined that there is a correlation by comparing the first speech and the second speech.

For example, in the embodiment 1610, if the second intention word included in the second speech is pre-stored, the electronic apparatus 100 may acquire first similarity between the first intention word and the second intention word. In addition, the electronic apparatus 100 may identify whether the acquired first similarity is a threshold value or more. In addition, the electronic apparatus 100 may acquire second similarity between the first target word and the second target word. In addition, the electronic apparatus 100 may identify whether the acquired second similarity is a threshold value or more.

If both the similarity between the intention words and the similarity between the target words are the threshold value or more, the electronic apparatus 100 may provide the complete response based on the first speech and the second speech. Specifically, the electronic apparatus 100 may provide the complete response based on the second intention word and the second target word.

For example, in the embodiment 1610, if the second intention word ("message") is pre-stored, the electronic apparatus 100 may execute an application for performing a function corresponding to the second intention word ("message"). Then, the electronic apparatus 100 may generate and output a screen 1620 on which the application is executed. The output may refer to an operation of displaying the generated screen 1620 on the display 140 included in the electronic apparatus 100 or an operation of transmitting the generated screen 1620 to an external device (not illustrated).

The screen 1620 may include the first target word ("miles"). For example, the electronic apparatus 100 may perform an operation of applying the function corresponding to the second intention word ("message") to the second target word ("miles"). For example, the electronic apparatus 100 may output the screen 1620 for transmitting a message to "miles".

Figure 17:
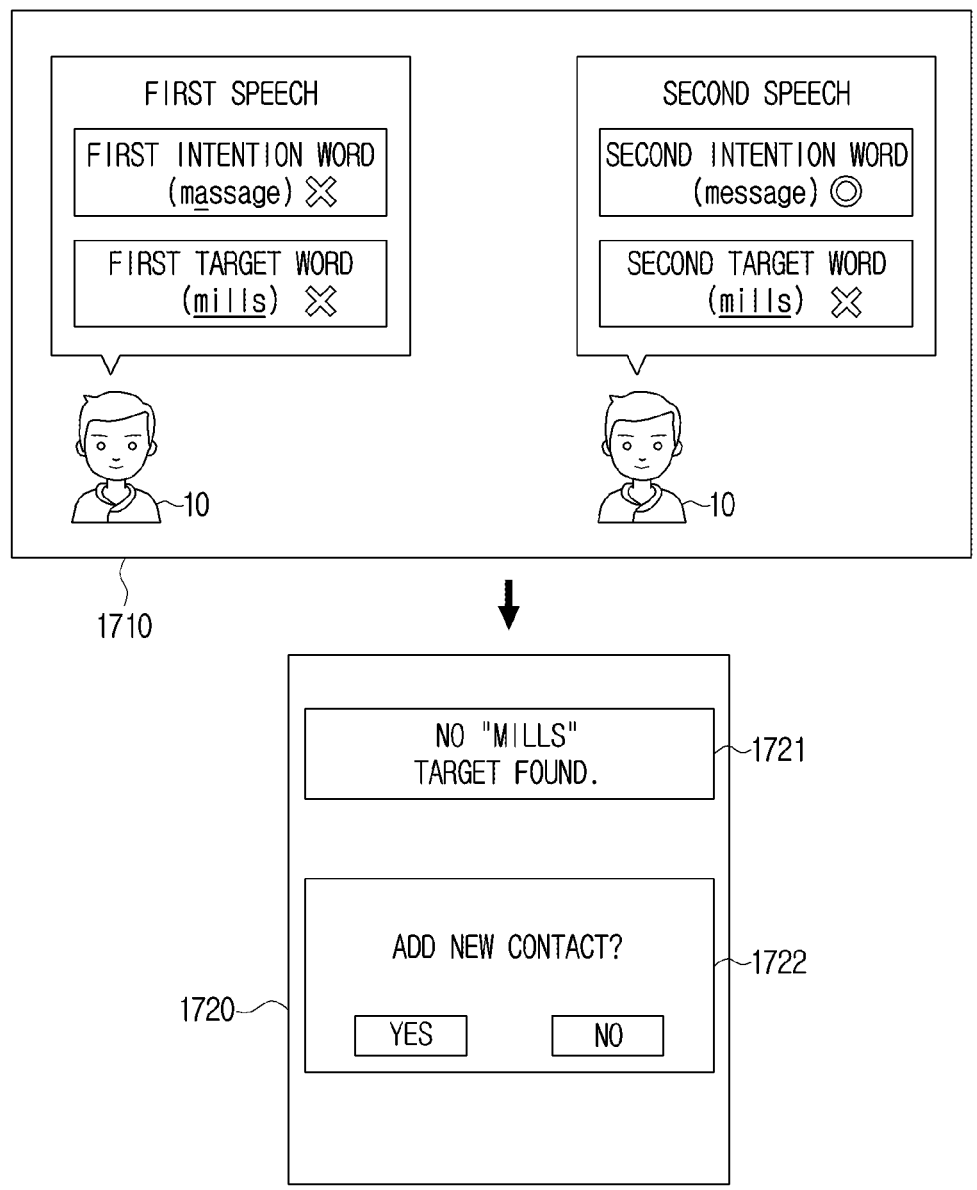
FIG. 17 is a diagram illustrating an example operation of the electronic apparatus when only the second intention word of the second speech is the pre-stored word according to various embodiments.

FIG. 17 is a diagram illustrating an example operation of the electronic apparatus 100 when only the second intention word of the second speech is the pre-stored word according to various embodiments.

Referring to FIG. 17, in an embodiment 1710, the electronic apparatus 100 may additionally acquire second speech of the user 10 including a second intention word and a second target word after acquiring the first speech of the embodiment 1510 of FIG. 15. The second intention word may be a pre-stored word and the second target word may not be a pre-stored word. For example, the second intention word may be "message" and the second target word may be "mills".

Even if the second intention word is pre-stored, when the second target word is not pre-stored, the electronic apparatus 100 may not provide a complete response.

When the second target word is not pre-stored, the electronic apparatus 100 may only perform a function corresponding to the second intended word and may not perform a detailed operation corresponding to the second target word.

When the second target word that is not pre-stored is acquired, the electronic apparatus 100 may output at least one of third information 1721 notifying that the complete response may not be provided or fourth information 1722 of querying a subsequent operation for providing the complete response. The output may refer to displaying image information through a display or reproducing audio information through a speaker.

The third information 1721 may include content that the electronic apparatus 100 may not provide a complete response based on the first speech and the second speech of the user 10. For example, the third information may include content notifying that the first target word ("mills") and the second target word ("mills) may not be found.

The purpose of the third information 1721 may be the same as or similar to that of the first information 1521 described in FIG. 15 in that the third information 1721 notifies that the complete response is not provided.

The fourth information 1722 may include content of querying whether to perform an operation for storing the second target word. For example, the fourth information may include content of querying whether to store (or add) the second target word ("mills") as a new contact.

The electronic apparatus 100 may display a screen 1720 including the third information 1721 and the fourth information 1722.

Figure 18:
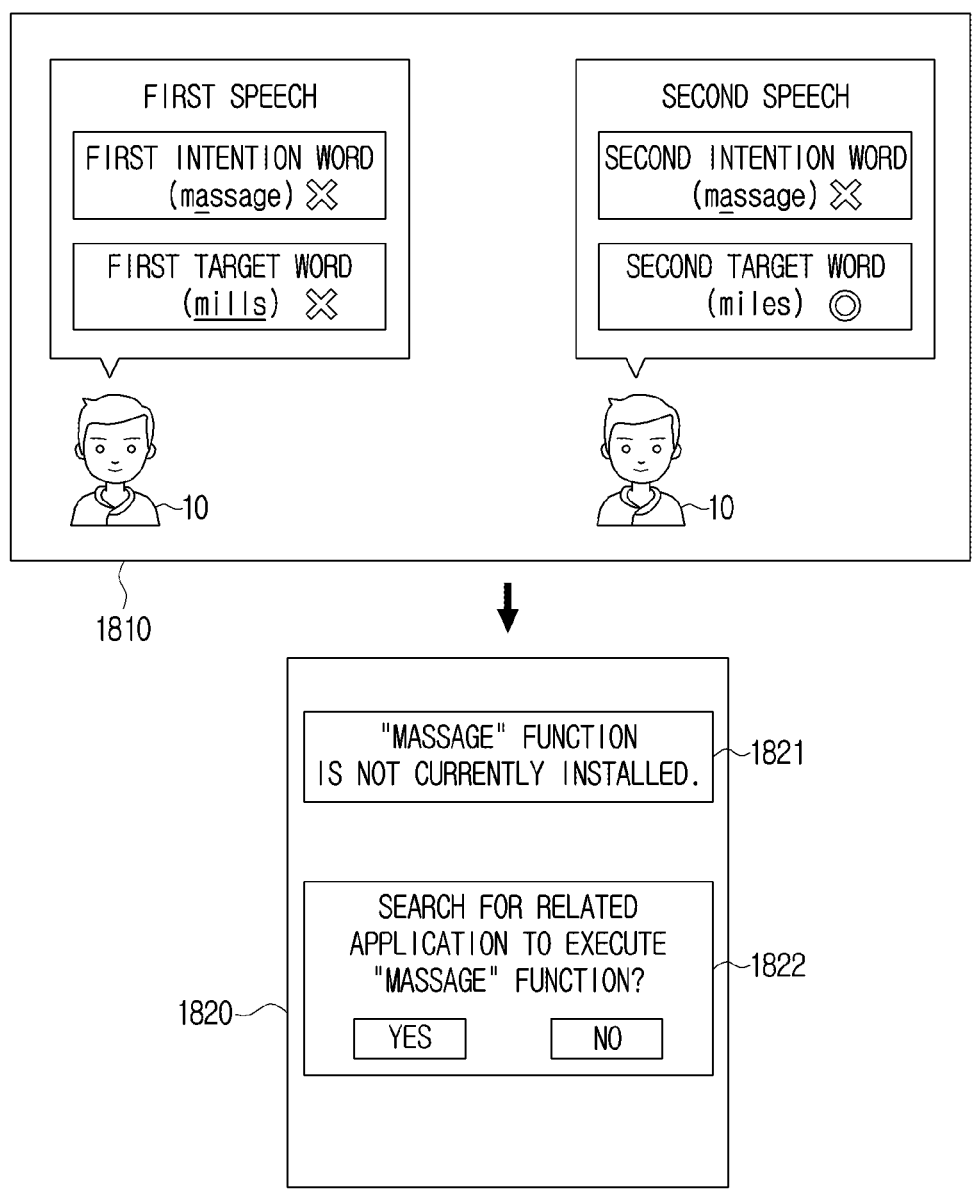
FIG. 18 is a diagram illustrating an example operation of the electronic apparatus when only the second target word of the second speech is the pre-stored word according to various embodiments.

FIG. 18 is a diagram illustrating an example operation of the electronic apparatus 100 when only the second target word of the second speech is the pre-stored word according to various embodiments.

Referring to FIG. 18, in an embodiment 1810, the electronic apparatus 100 may additionally acquire second speech of the user 10 including a second intention word and a second target word after acquiring the first speech of the embodiment 1510 of FIG. 15. The second intention word may not be a pre-stored word and the second target word may be a pre-stored word. For example, the second intention word may be "massage" and the second target word may be "miles".

Even if the second target word is pre-stored, when the second intention word is not pre-stored, the electronic apparatus 100 may not provide a complete response.

When the second intention word that is not pre-stored is acquired, the electronic apparatus 100 may output at least one of third information 1821 notifying that the complete response may not be provided or fourth information 1822 that queries a subsequent operation for providing the complete response. Here, the output may refer to displaying image information through a display or reproducing audio information through a speaker.

The third information 1821 may include content that the electronic apparatus 100 may not provide a complete response based on the first speech and the second speech of the user 10. For example, the third information may include content notifying that a function corresponding to the second intention word ("massage") is not found (or may not be executed).

The purpose of the third information 1821 may be the same as or similar to that of the first information 1521 described in FIG. 15 in that the third information 1721 notifies that the complete response is not provided.

The fourth information 1822 may include content of querying to the user 10 whether to download an application for executing the function corresponding to the second intention word. For example, the fourth information may include content of querying whether to search for an application related to the function corresponding to the second intention word ("massage") from an external server.

The electronic apparatus 100 may display a screen 1820 including the third information 1821 and the fourth information 1822.

Figure 19:
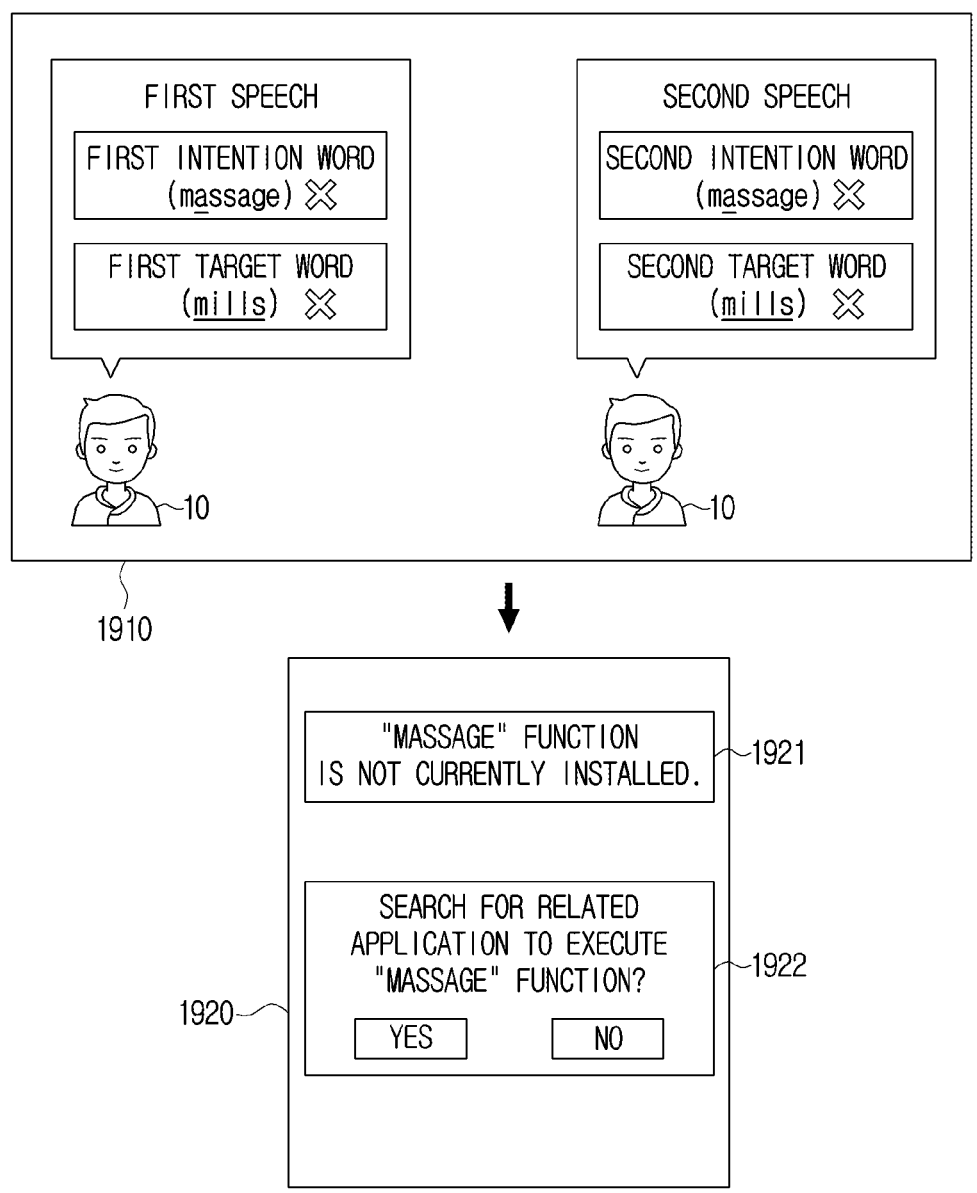
FIG. 19 is a diagram illustrating an example operation of the electronic apparatus when the pre-stored words are not included in the second speech according to various embodiments.

FIG. 19 is a diagram illustrating an example operation of the electronic apparatus 100 when the pre-stored words are not included in the second speech according to various embodiments.

Referring to FIG. 19, in an embodiment 1910, the electronic apparatus 100 may additionally acquire second speech of the user 10 including a second intention word and a second target word after acquiring the first speech of the embodiment 1510 of FIG. 15. The second intention word and the second target word may not be pre-stored words. For example, the second intention word may be "massage" and the second target word may be "mills".

When the second intention word and the second target word are not pre-stored, the electronic apparatus 100 may not provide a complete response.

When the second intention word is not pre-stored, the electronic apparatus 100 may perform the same or similar operation as that in the embodiment 1810 of FIG. 18. Unlike the embodiment 1910 of FIG. 19, in the embodiment 1810 of FIG. 18, the second target word ("miles") is pre-stored, but the electronic apparatus 100 may not perform a specific function only with the second target word ("miles"). Therefore, when the second intention word that is not pre-stored is acquired regardless of whether the second target word ("miles") is pre-stored, the electronic apparatus 100 may output at least one of third information 1921 notifying that the complete response may not be provided or fourth information 1922 that queries a subsequent operation for providing the complete response.

The electronic apparatus 100 may display a screen 1920 including the third information 1921 and the fourth information 1922.

Figure 20:
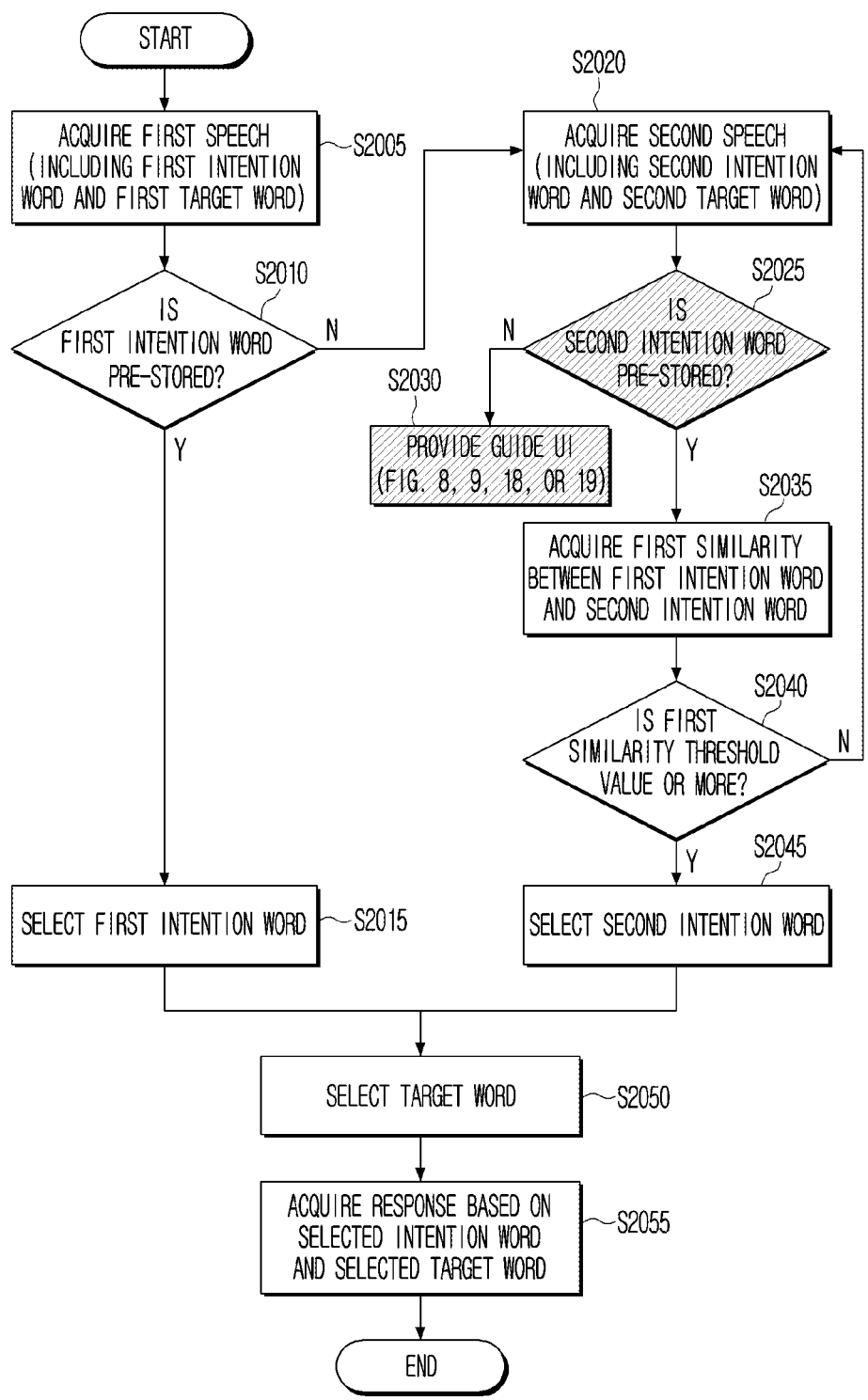
FIG. 20 is a flowchart illustrating an example operation of selecting an intention word according to various embodiments.

FIG. 20 is a flowchart illustrating an example operation of selecting an intention word according to various embodiments.

Referring to FIG. 20, the electronic apparatus 100 may acquire first speech (S2005). The first speech may include a first intention word and a first target word. In addition, the electronic apparatus 100 may identify whether the first intention word is a pre-stored word (S2010). If the first intention word is the pre-stored word (S2010-Y), the electronic apparatus 100 may select the first intention word (S2015). Here, the selection may refer to an operation of determining an intention word for performing speech recognition.

If the first intention word is not the pre-stored word (S2010-N), the electronic apparatus 100 may acquire second speech (S2020). The second speech may include a second intention word and a second target word.

In addition, the electronic apparatus 100 may identify whether the second intention word is a pre-stored word (S2025). If the first intention word is not the pre-stored word (S2010-N), the electronic apparatus 100 may provide a guide UI (S2030). The guide UI may include information notifying that a complete response may not be provided. The description related to the guide UI has been made, for example, with reference to FIG. 8, 9, 18, or 19. The electronic apparatus 100 may generate the guide UI based on the second speech.

If the second intention word is the pre-stored word (S2025-Y), the electronic apparatus 100 may acquire first similarity between the first intention word and the second intention word (S2035). In addition, the electronic apparatus 100 may identify whether the first similarity is a threshold value or more (S2040). If the first similarity is less than the threshold value (S2040-N), the electronic apparatus 100 may repeatedly acquire new second speech.

If the first similarity is the threshold value or more (S2040-Y), the electronic apparatus 100 may select the second intention word (S2045). The selection may refer to an operation of determining an intention word for performing speech recognition.

When the intention word is selected, the electronic apparatus 100 may select a target word (S2050). An operation of selecting the target word will be described in greater detail below with reference to FIG. 21. In addition, the electronic apparatus 100 may acquire a response based on the selected intention word and the selected target word (S2055).

Figure 21:
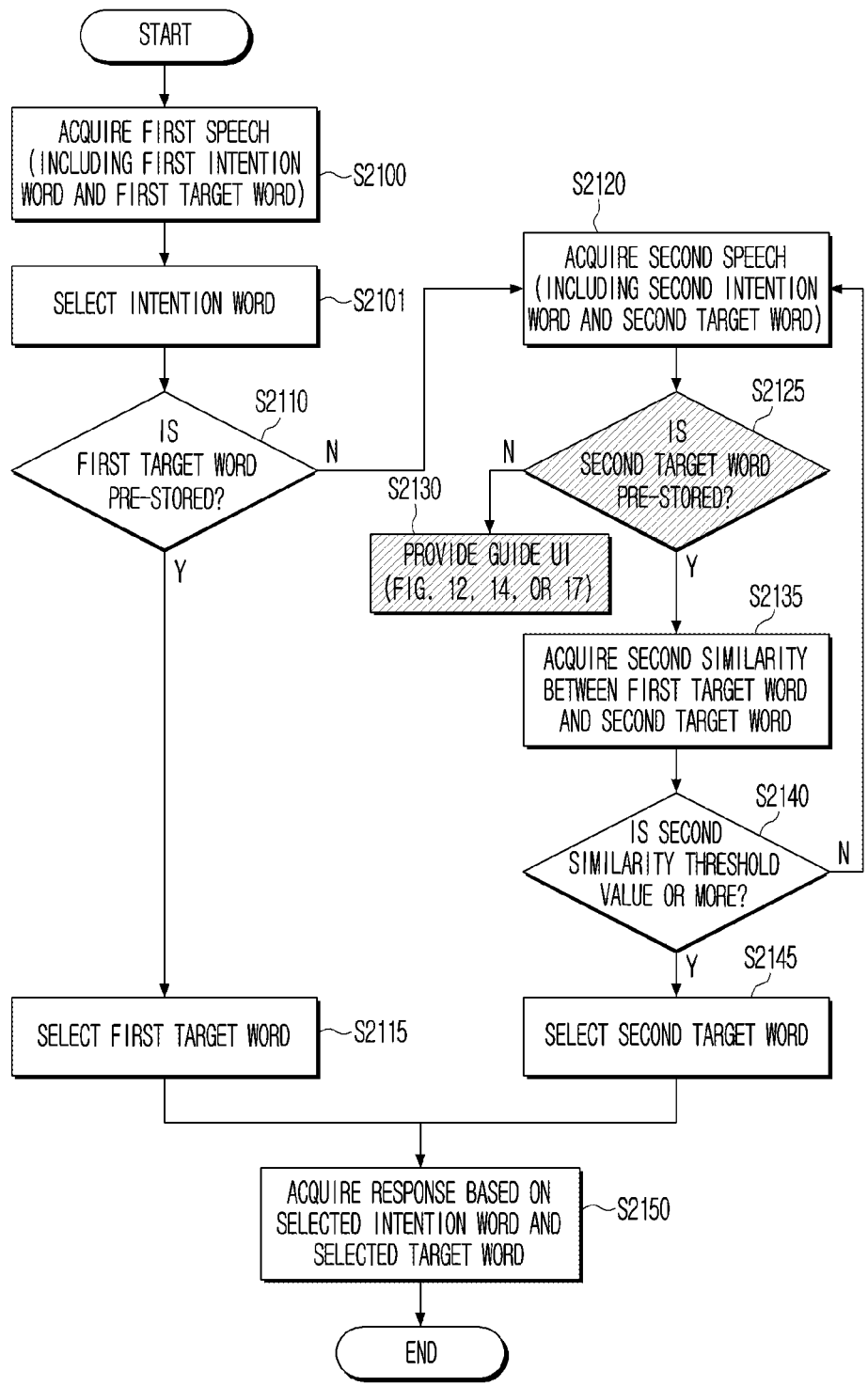
FIG. 21 is a flowchart illustrating an example operation of selecting a target word according to various embodiments.

FIG. 21 is a flowchart illustrating an example operation of selecting a target word according to various embodiments.

Referring to FIG. 21, the electronic apparatus 100 may acquire first speech (S2100). In addition, the electronic apparatus 100 may select an intention word (S2101). The operation of acquiring the first speech and the operation of acquiring the intention word have been described with reference to FIG. 20.

In addition, the electronic apparatus 100 may identify whether a first target word is a pre-stored word (S2110). If the first target word is the pre-stored word (S2110-Y), the electronic apparatus 100 may select the first target word (S2115). The selection may refer to an operation of determining an intention word for performing speech recognition.

If the first target word is not the pre-stored word (S2110-N), the electronic apparatus 100 may acquire second speech (S2120). The second speech may include a second intention word and a second target word.

In addition, the electronic apparatus 100 may identify whether the second target word is a pre-stored word (S2125). If the second target word is not the pre-stored word (S2125-N), the electronic apparatus may provide a guide UI (S2130). The guide UI may include information notifying that a complete response may not be provided. The description related to the guide UI has been made, for example, with reference to FIG. 12, 14, or 17. The electronic apparatus 100 may generate the guide UI based on the second speech.

If the second target word is the pre-stored word (S2125-Y), the electronic apparatus 100 may acquire second similarity between the first target word and the second target word (S2135). In addition, the electronic apparatus 100 may identify whether the second similarity is a threshold value or more (S2140). If the second similarity is less than the threshold value (S2140-N), the electronic apparatus 100 may repeatedly acquire new second speech.

If the second similarity is the threshold value or more (S2140-Y), the electronic apparatus 100 may select the second target word (S2145). Here, the selection may refer to an operation of determining a target word for performing speech recognition.

The electronic apparatus 100 may acquire a response based on the selected intention word and the selected target word (S2150).

In the embodiments described in FIGS. 20 and 21, it is first determined whether the word is pre-stored, and the similarity calculation is performed later. If it is first determined whether the word is pre-stored, the electronic apparatus 100 may not calculate similarity for words that are not pre-stored. Accordingly, the electronic apparatus 100 may reduce a processing speed compared to the embodiments of FIGS. 22 and 23.

Figure 22:
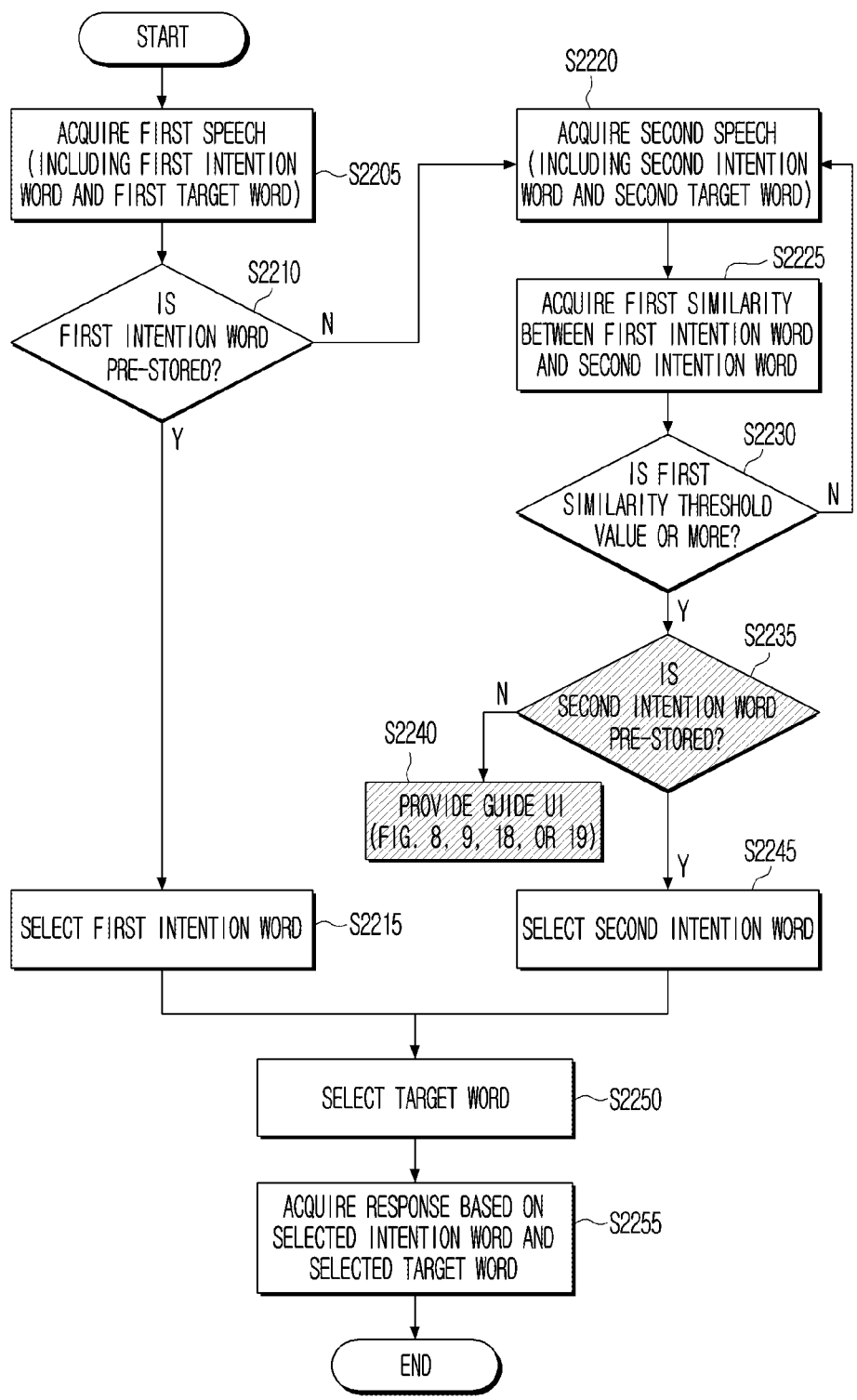
FIG. 22 is a flowchart illustrating an example operation of selecting an intention word according to various embodiments.

FIG. 22 is a flowchart illustrating an example operation of selecting an intention word according to an embodiment.

Referring to FIG. 22, the electronic apparatus 100 may acquire first speech (S2205). The first speech may include a first intention word and a first target word. In addition, the electronic apparatus 100 may identify whether the first intention word is a pre-stored word (S2210). If the first intention word is the pre-stored word (S2210-Y), the electronic apparatus 100 may select the first intention word (S2215). The selection may refer to an operation of determining an intention word for performing speech recognition.

If the first intention word is not the pre-stored word (S2210-N), the electronic apparatus 100 may acquire second speech (S2220). Here, the second speech may include a second intention word and a second target word.

The electronic apparatus 100 may acquire first similarity between the first intention word and the second intention word (S2225). In addition, the electronic apparatus 100 may identify whether the first similarity is a threshold value or more (S2230). If the first similarity is less than the threshold value (S2230-N), the electronic apparatus 100 may repeatedly acquire new second speech.

If the first similarity is the threshold value or more (S2230-Y), the electronic apparatus 100 may identify whether the second intention word is a pre-stored word (S2235). If the second intention word is not the pre-stored word (S2235-N), the electronic apparatus may provide a guide UI (S2240). The guide UI may include information notifying that a complete response may not be provided. The description related to the guide UI has been made, for example, with reference to FIG. 8, 9, 18, or 19. The electronic apparatus 100 may generate the guide UI based on the second speech.

If the second intention word is the pre-stored word (S2235-Y), the electronic apparatus 100 may select the second intention word (S2245). The selection may refer to an operation of determining an intention word for performing speech recognition.

When the intention word is selected, the electronic apparatus 100 may select a target word (S2250). An operation of selecting the target word will be described in greater detail below with reference to FIG. 23. In addition, the electronic apparatus 100 may acquire a response based on the selected intention word and the selected target word (S2255).

Figure 23:
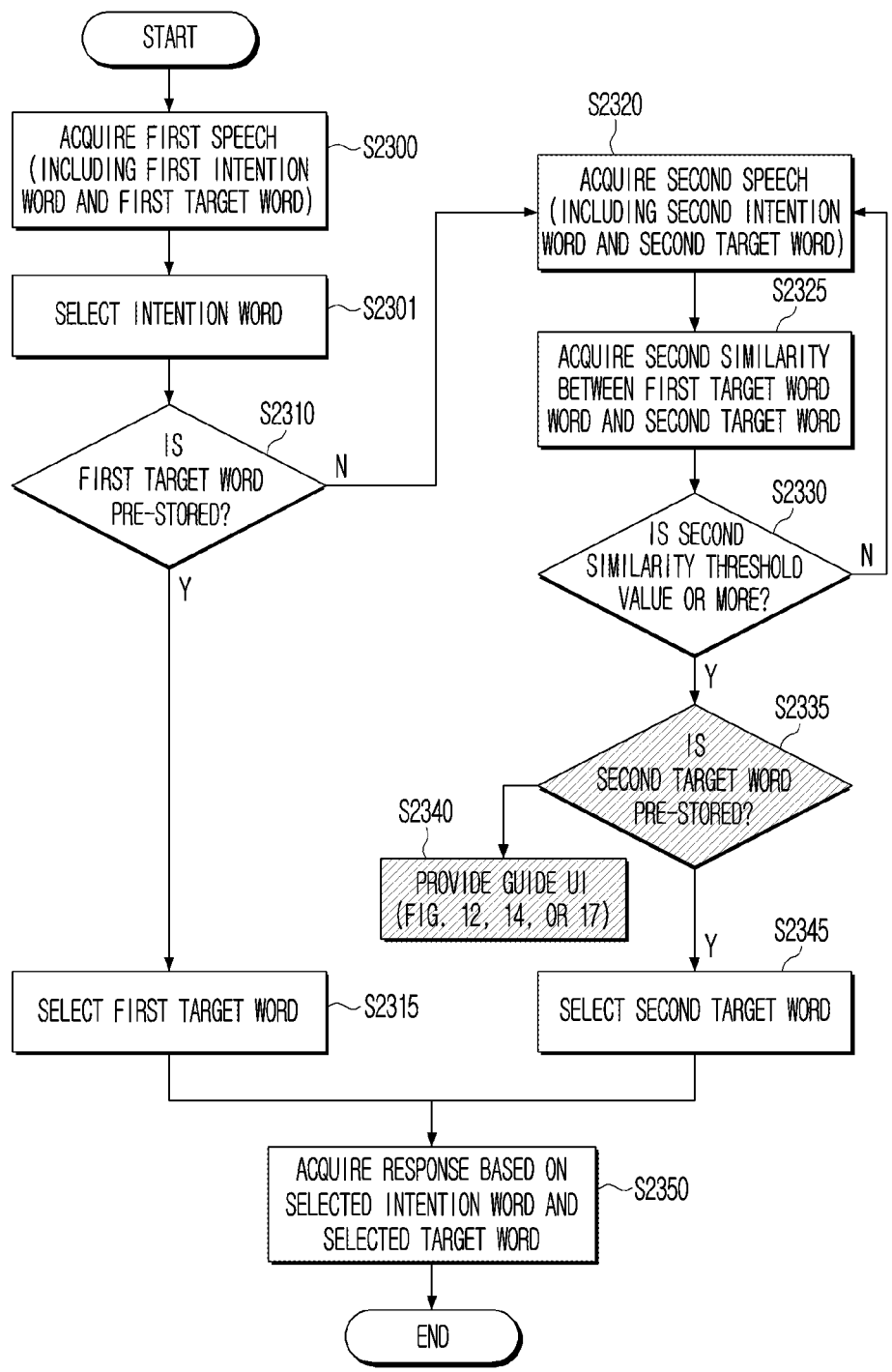
FIG. 23 is a flowchart illustrating an example operation of selecting a target word according to various embodiments.

FIG. 23 is a flowchart illustrating an example operation of selecting a target word according to an embodiment.

Referring to FIG. 23, the electronic apparatus 100 may acquire first speech (S2300). In addition, the electronic apparatus 100 may select an intention word (S2301). The operation of acquiring the first speech and the operation of acquiring the intention word have been described with reference to FIG. 22.

In addition, the electronic apparatus 100 may identify whether a first target word is a pre-stored word (S2310). If the first target word is the pre-stored word (S2310-Y), the electronic apparatus 100 may select the first target word (S2315). The selection may refer to an operation of determining an intention word for performing speech recognition.

If the first target word is not the pre-stored word (S2310-N), the electronic apparatus 100 may acquire second speech (S2320). The second speech may include a second intention word and a second target word.

The electronic apparatus 100 may acquire second similarity between the first target word and the second target word (S2325). The electronic apparatus 100 may identify whether the second similarity is a threshold value or more (S2330). If the second similarity is less than the threshold value (S2330-N), the electronic apparatus 100 may repeatedly acquire new second speech.

If the second similarity is the threshold value or more (S2330-Y), the electronic apparatus 100 may identify whether the second target word is a pre-stored word (S2335). If the second target word is not the pre-stored word (S2335-N), the electronic apparatus may provide a guide UI (S2340). The guide UI may include information notifying that a complete response may not be provided. The description related to the guide UI has been made, for example, with reference to FIG. 12, 14, or 17. The electronic apparatus 100 may generate the guide UI based on the second speech.

If the second target word is the pre-stored word (S2335-Y), the electronic apparatus 100 may select the second target word (S2345). Here, the selection may refer to an operation of determining a target word for performing speech recognition.

The electronic apparatus 100 may acquire a response based on the selected intention word and the selected target word (S2350).

In the embodiments described in FIGS. 22 and 23, the similarity calculation is first performed and whether or not the word is pre-stored is performed later. When the similarity calculation is performed first, it may be accurately determined whether the first speech and second speech are related. Therefore, the electronic apparatus 100 may clearly identify whether continuous user's speeches are complementary or separate speech. Therefore, the electronic apparatus 100 may provide a high-accuracy speech recognition service to the user by identifying the relevance of speeches of a plurality of users.

Figure 24:
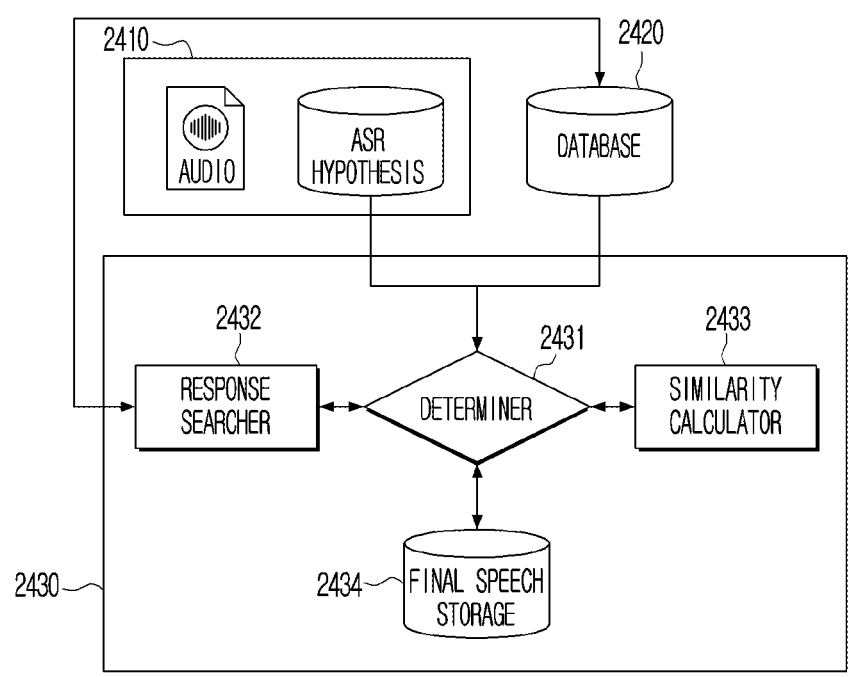
FIG. 24 is a diagram illustrating an example operation of recognizing user's speech according to various embodiments.

FIG. 24 is a diagram illustrating an example operation of recognizing user's speech.

Referring to FIG. 24, the electronic apparatus 100 may include a speech recognition module (e.g., including various processing circuitry and/or executable program instructions) 2410, a database 2420, and a user speech analysis module (e.g., including various processing circuitry and/or executable program instructions) 2430.

The speech recognition module 2410 may perform automatic speech recognition (ASR). For example, the speech recognition module 2410 may include various processing circuitry and/or executable program instructions and convert user's speech into text. When received user's speech is an audio signal, the speech recognition module 2410 may convert the received user's speech (audio signal) into a digital signal, and convert the converted digital signal into text data. According to an implementation example, the speech recognition module 2410 may receive the converted digital signal. The speech recognition module 2410 may identify the converted text data as a hypothesis corresponding to the received user's speech. Here, the speech recognition module 2410 may include an ASR Logs database.

The database 2420 may be a natural language understanding (NLU) database. The database 2420 may store a plurality intention words and a plurality of target words. In addition, the database 2420 may store a plurality of responses. Therefore, the database 2420 may perform an operation of providing a response suitable for the user's speech to the speech analysis module 2430.

The speech analysis module 2430 may include various processing circuitry and/or executable program instructions and perform an operation of providing a response by analyzing the user's speech. The speech analysis module 2430 may acquire a response using a determiner 2431, a response searcher 2432, a similarity calculator 2433, and a final speech storage 2434.

The determiner 2431 may include various processing circuitry and/or executable program instructions and determine whether a response may be provided using only the received user's speech. The response searcher 2432 may include various processing circuitry and/or executable program instructions and identify whether a response corresponding to the user's speech exists using the database 2420. The similarity calculator 2433 may include various processing circuitry and/or executable program instructions and perform an operation of comparing relevance between the previous speech and newly received speech when new user's speech is received. When the relevance between the previous speech and the newly received speech is low, the speech analysis module 2430 may not provide a response by determining that user commands that are not identical to each other are received. The final speech storage 2434 may store final speech capable of providing a response based on the received user's speech (including a plurality of user's speeches). Here, the final speech may include an intention word and a target word finally selected based on the plurality of user's speeches.

FIG. 25 is a diagram illustrating an example process of calculating similarity according to various embodiments.

Referring to FIG. 25, when the letters that are compared are similar (or identical), the electronic apparatus 100 increases a score by 1. When the letters that are compared are not similar, the score may retain its original value. In addition, the score may be calculated from a first letter of each word to be compared to the last letter. In addition, when moving to a score of a next cell, a maximum value of the neighboring cell may be used.

In an embodiment 2510, the electronic apparatus 100 may acquire similarity between "message" and "pleas". The score may be 0 because the starting letters "m" and "p" of each word are not similar. In addition, because a second letter "e" of "message" and a third letter "e" of "pleas" are similar (same), the score may be increased from 0 to 1. In addition, because a third letter "s" of "message" and a fifth letter "s" of "pleas" are similar (same), the score may be increased from 0 to 1. In addition, because a fifth letter "a" of "message" and a fourth letter "a" of "pleas" are similar (same), the score may be increased from 1 to 2. The similarity between "message" and "pleas" may be 2.

In an embodiment 2520, the electronic apparatus 100 may acquire similarity between "message" and "massage". Because the starting letter "m" and "m" of each word are similar (identical), the score may be increased from 0 to 1. In addition, because a third letter "s" of "message" and a third letter "s" of "massage" are similar (same), the score may be increased from 1 to 2. In addition, because a fourth letter "s" of "message" and a fourth letter "s" of "massage" are similar (same), the score may be increased from 2 to 3. In addition, because a fifth letter "a" of "message" and a fifth letter "a" of "massage" are similar (same), the score may be increased from 3 to 4. In addition, because a sixth letter "g" of "message" and a sixth letter "g" of "massage" are similar (same), the score may be increased from 4 to 5. In addition, because a seventh letter "e" of "message" and a seventh letter "e" of "massage" are similar (same), the score may be increased from 5 to 6. Finally, the similarity between "message" and "massage" may be 6.

Figure 26:
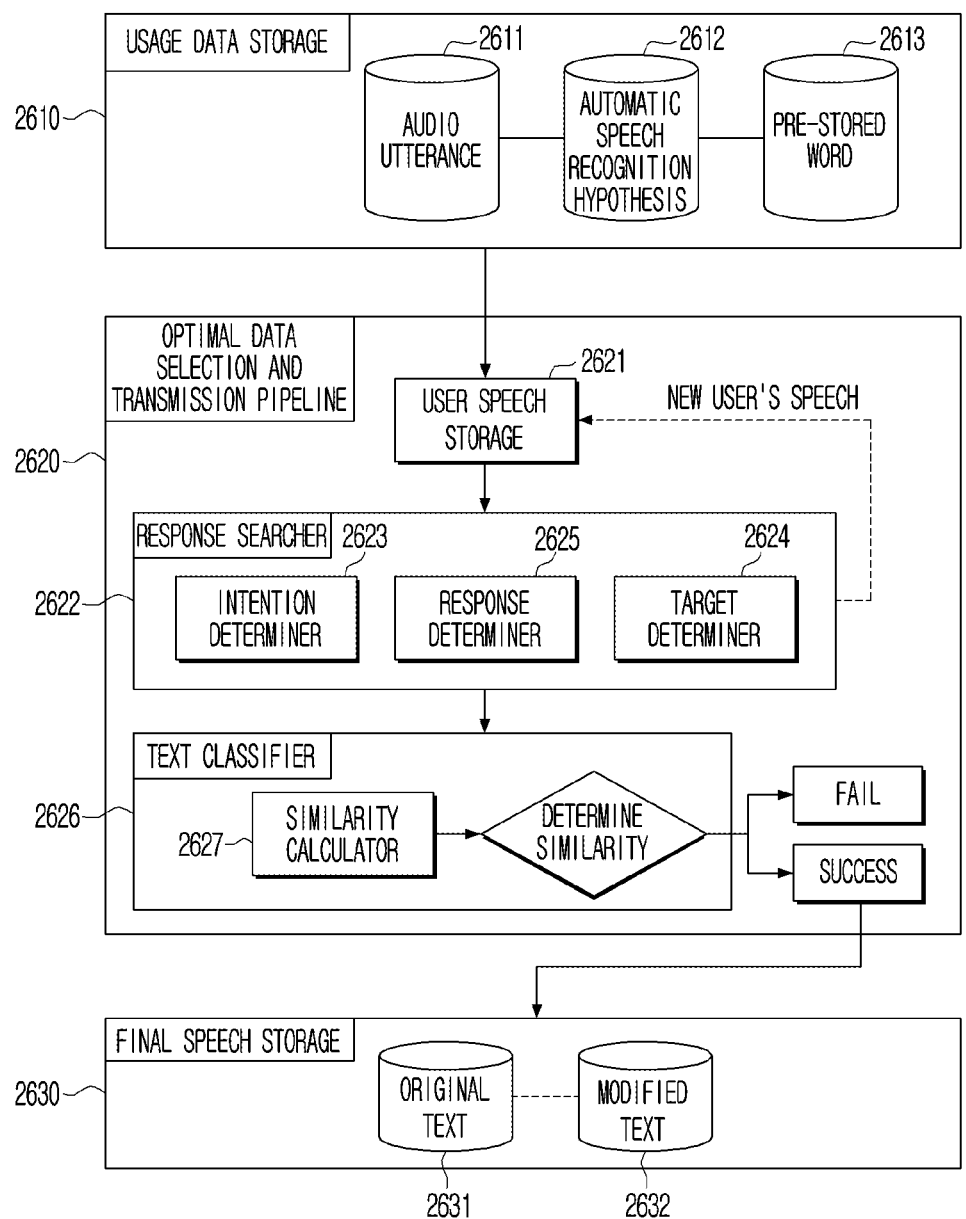
FIG. 26 is a block diagram illustrating an example in which speech recognition is performed by repeatedly acquiring a plurality of speeches until speech satisfying a specified criterion is identified according to various embodiments.

FIG. 26 is a block diagram illustrating an example configuration in which speech recognition is performed by repeatedly acquiring a plurality of speeches until speech satisfying a specified criterion is identified according to various embodiments.

Referring to FIG. 26, the electronic apparatus 100 may include a usage data storage 2610, an optimal data selection and transmission pipeline (e.g., including various processing circuitry and/or executable program instructions) 2620, and a final speech storage 2630.

The usage data storage 2610 may include an audio utterance 2611, an automatic speech recognition hypothesis 2612, and a pre-stored word 2613.

The optimal data selection and transmission pipeline 2620 may include a user speech storage 2621, a response searcher 2622, and a text classifier 2626, each of which may include various processing circuitry and/or executable program instructions.

The user speech storage 2621 may store at least one user's speech. If new user's speech is acquired, the user speech storage 2621 may store both the previous user's speech and the newly acquired user's speech.

The response searcher 2622 may include an intention determiner 2623, a target determiner 2624, and a response determiner 2625. The intention determiner 2623 may identify an intention word included in the user's speech and identify whether the identified intention word is a pre-stored word. The target determiner 2624 may identify a target word included in the user's speech and identify whether the identified target word is a pre-stored word. The response determiner 2625 may determine (or acquire) a response corresponding to the user's speech based on the determined (or selected) intention word and target word.

The text classifier 2626 may include a similarity calculator 2627. Here, the similarity calculator 2627 may acquire similarity by comparing first speech and second speech. For example, the similarity may include at least one of first similarity between the intention words and second similarity between the target words. If the similarity is a threshold value or more, the optimal data selection and transmission pipeline 2620 may acquire a response based on the first speech and the second speech.

The final speech storage 2630 may store original text 2631 and modified text 2632. The original text 2631 may be text acquired based on the first speech, and the modified text 2632 may be text supplemented with the first speech based on the second speech.

Figure 27:
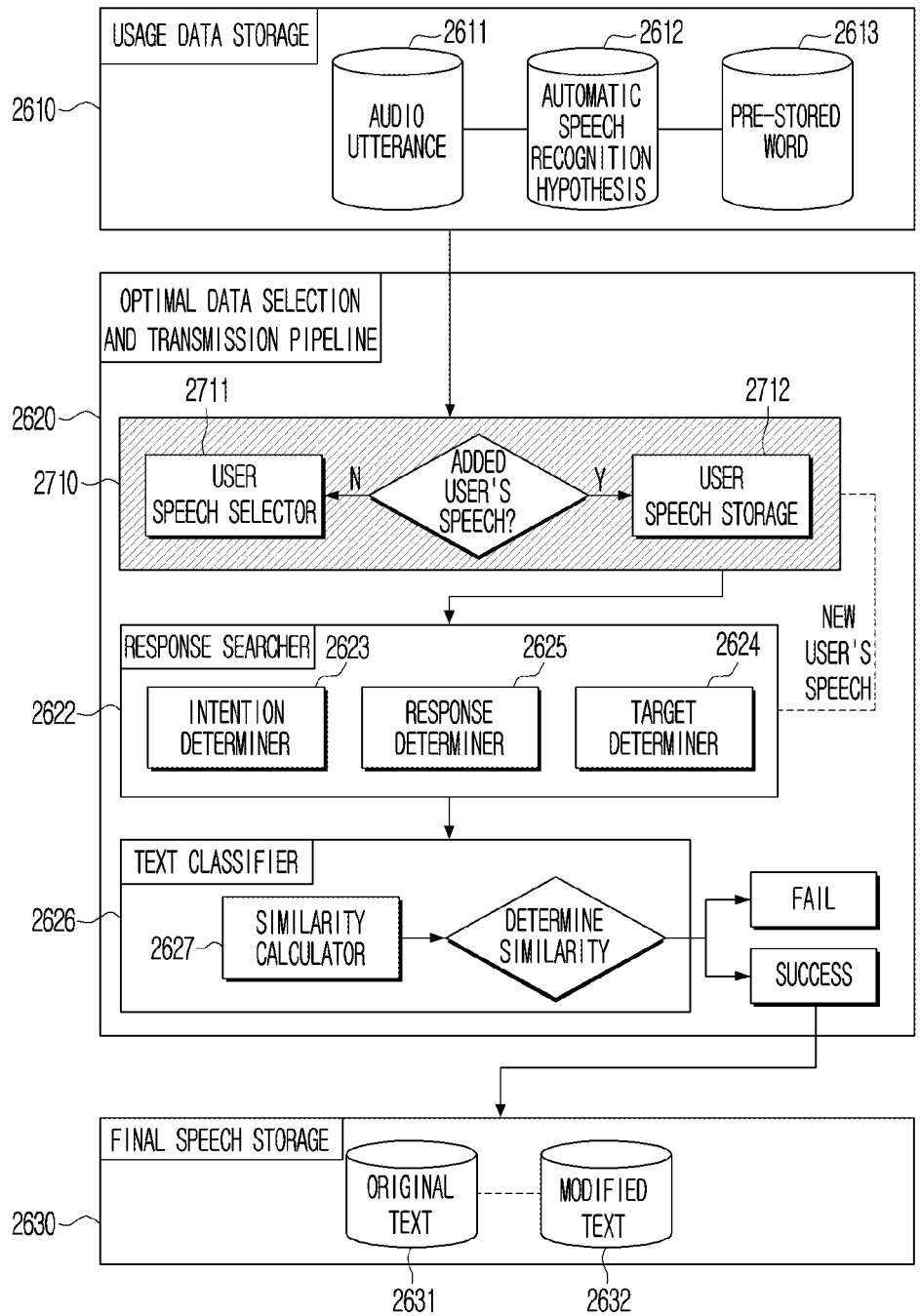
FIG. 27 is a block diagram illustrating an example in which speech recognition is performed with one speech among the plurality of speeches according to various embodiments.

FIG. 27 is a block diagram illustrating an example configuration in which speech recognition is performed with one speech among the plurality of speeches according to various embodiments.

Referring to FIG. 27, the optimal data selection and transmission pipeline 2620 of the electronic apparatus 100 may further include a user speech manager (e.g., including various processing circuitry and/or executable program instructions) 2710. Components other than that of the electronic apparatus 100 are the same as or similar to those of FIG. 26, and thus a redundant description may not be repeated.

The user speech manager 2710 may include a user speech selector 2711 and a user speech storage 2712, each of which may include various processing circuitry and/or executable program instructions. The user speech selector 2711 may select user's speech most suitable for providing a response among a plurality of user's speeches. For example, when a plurality of user's speeches are acquired with a poor recognition rate of the user's speech, an intention word and a target word may be included in each of the plurality of user's speeches. The user speech selector 2711 may select user's speech having a good speech recognition rate among the plurality of user's speeches. The user speech storage 2712 may store the plurality of user's speeches.

If new user's speech is received, the user speech manager 2710 may store both the previous user's speech and the new user's speech in the user speech storage 2712. If the new user's speech is not received, the user speech manager 2710 may select at least one user's speech among the plurality of user's speeches using the user speech selector 2711, and transmit the at least one selected user's speech to the response searcher.

FIG. 28 is a table illustrating an example operation of acquiring a response corresponding to speech according to various embodiments.

Referring to FIG. 28, a table 2810 may include conversation identification information, user speech identification information, and text information. The conversation identification information may be information indicating a time point at which the user's speech is received. For example, first speech acquired at 3:30:17 PM on Aug. 1, 2021 and second speech acquire at 3:30:35 PM on Aug. 1, 2021 may have the same or similar conversation identification information.

The user speech identification information may be different for each received speech. In the above example, the first speech and the second speech may have different "user speech identification information".

The text information may include text corresponding to the received user's speech. The text information may be a result of converting an audio signal into the text information.

Table 2820 may include conversation identification information, user speech identification information, natural language understanding (NLU), and response information. The electronic apparatus 100 may perform a speech recognition operation on the user's speech using natural language understanding (NLU). In addition, the electronic apparatus 100 may acquire response information as a result of the speech recognition.

Figure 29:
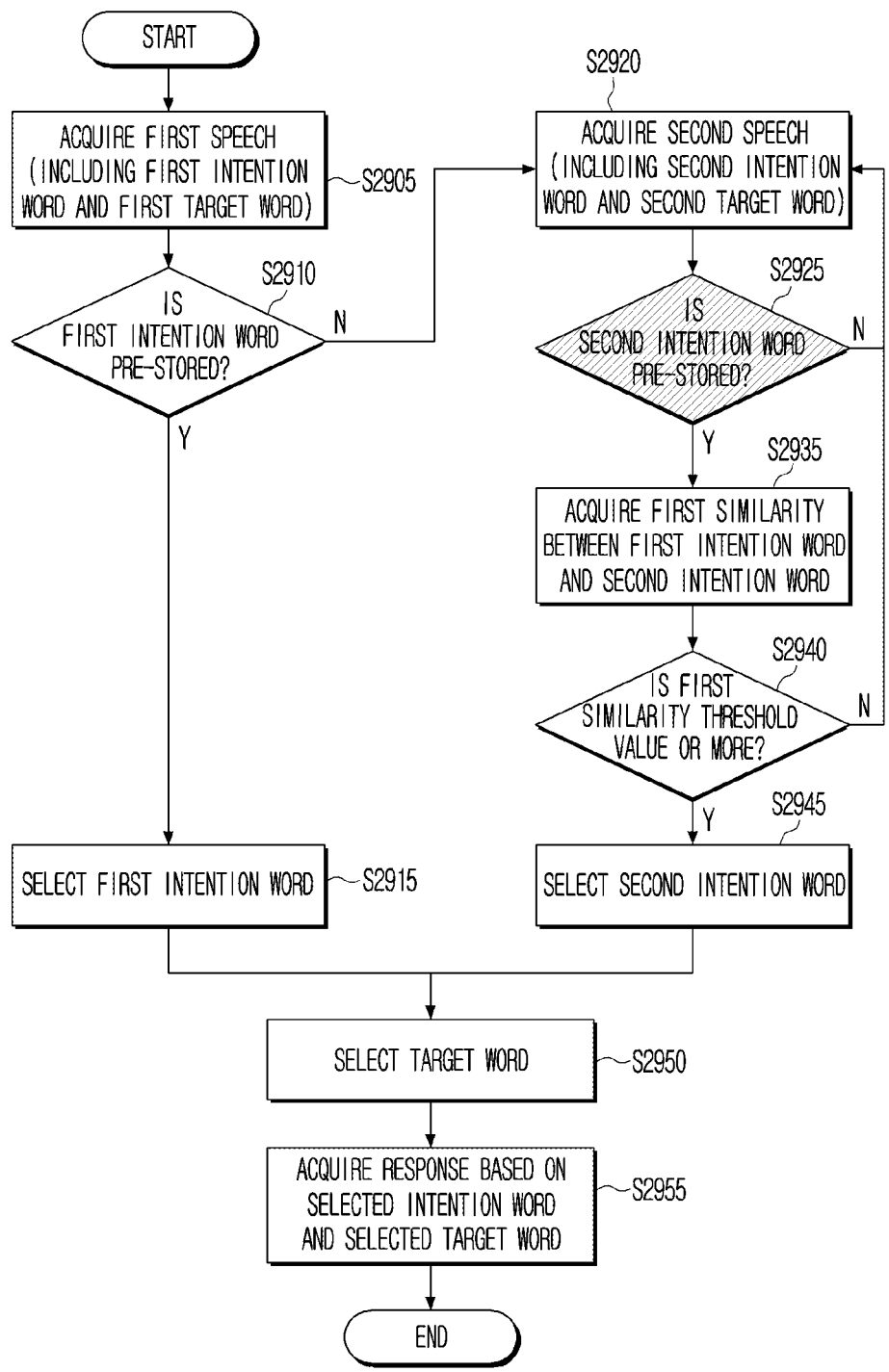
FIG. 29 is a flowchart illustrating an example operation of selecting an intention word according to various embodiments.

FIG. 29 is a flowchart illustrating an example operation of selecting an intention word according to various embodiments.

Referring to FIG. 29, operations S2905, S2910, S2915, S2920, S2925, S2935, S2940, S2945, S2950, and S2955 of FIG. 29 may correspond to operations S2005, S2010, S2015, S2020, S2025, S2035, S2040, S2045, S2050, and S2055 of FIG. 20, and thus redundant description may not be repeated.

The electronic apparatus 100 may repeatedly acquire new second speech instead of the operation S2030 of outputting the guide UI in the embodiment of FIG. 20. For example, if the second intention word is not the pre-stored word (S2925-N), the electronic apparatus 100 may repeatedly acquire new second speech.

Figure 30:
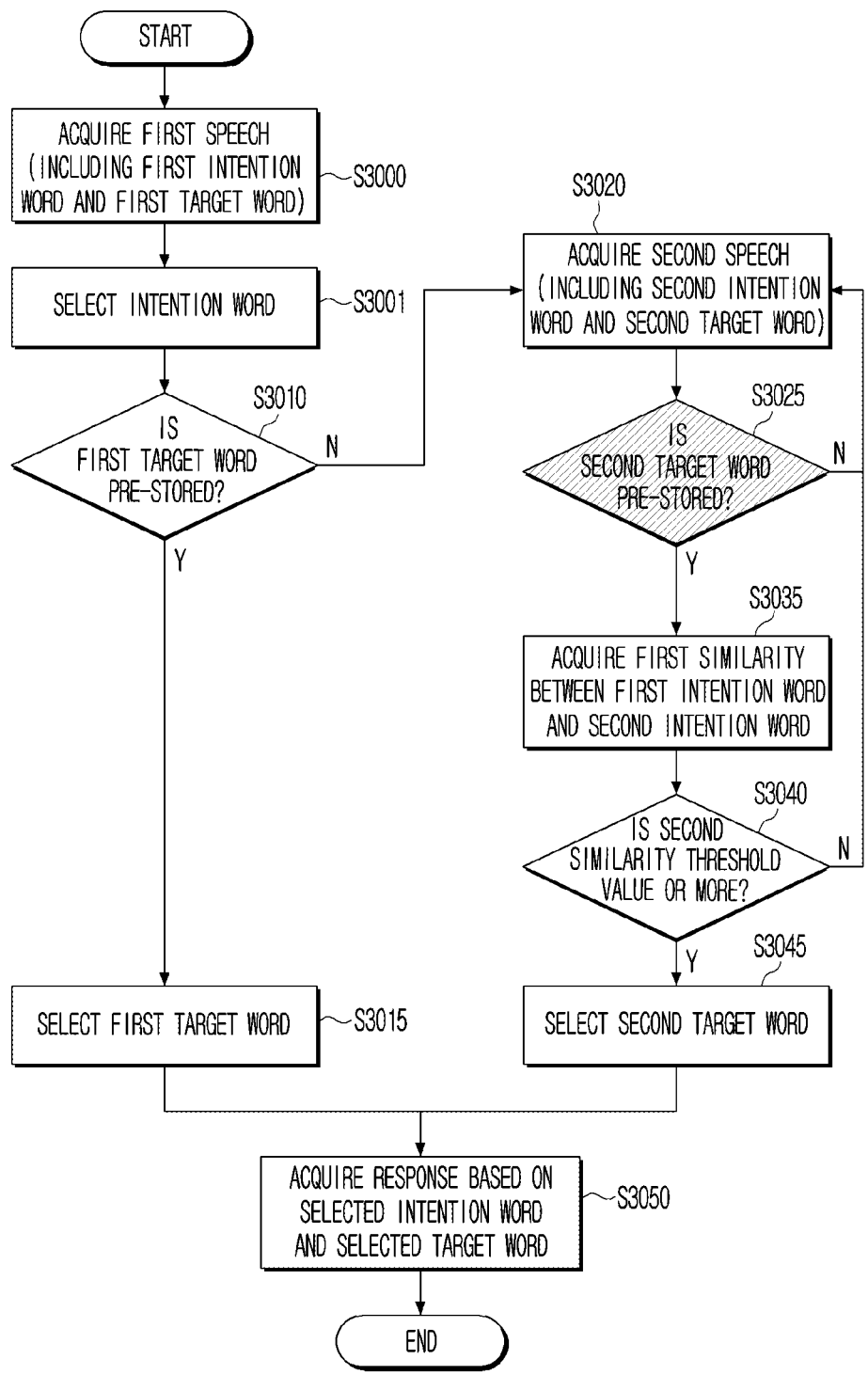
FIG. 30 is a flowchart illustrating an example operation of selecting a target word according to various embodiments.

FIG. 30 is a flowchart for illustrating an example operation of selecting a target word according various embodiments.

Referring to FIG. 30, operations S3000, S3001, S3010, S3015, S3020, S3025, S3035, S3040, S3045, and S3050 of FIG. 30 may correspond to operations S2100, S2101, S2110, S2115, S2120, S2125, S2135, S2140, S2145, and S2150 of FIG. 21, and thus redundant description may not be repeated.

The electronic apparatus 100 may repeatedly acquire new second speech instead of the operation S2130 of outputting the guide UI in the embodiment of FIG. 21. For example, if the second target word is not the pre-stored word (S3025-N), the electronic apparatus 100 may repeatedly acquire new second speech.

Figure 31:
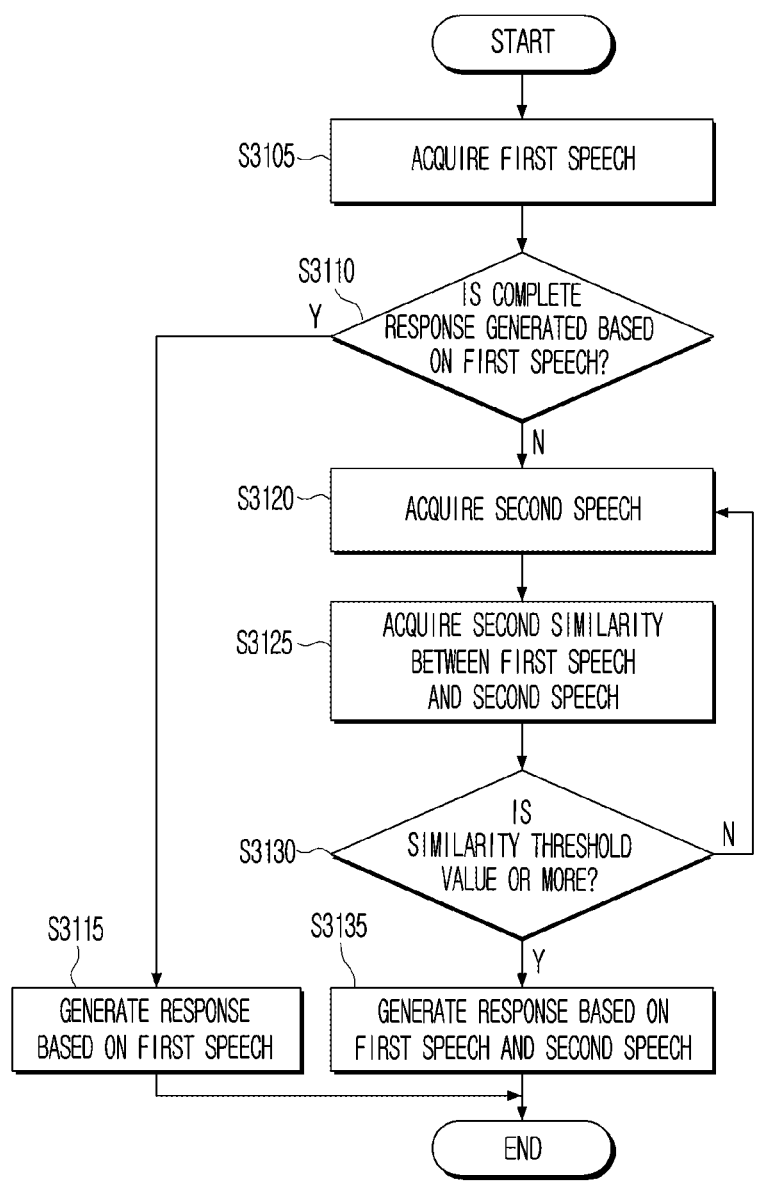
FIG. 31 is a flowchart illustrating an example operation of acquiring overall similarity between first speech and second speech according to various embodiments.

FIG. 31 is a flowchart illustrating an example operation of acquiring overall similarity between first speech and second speech according to various embodiments.

Referring to FIG. 31, the electronic apparatus 100 may acquire first speech (S3105). The electronic apparatus 100 may identify whether a complete response may be generated based on the first speech (S3110). If the complete response may be generated based on the first speech (S3110-Y), the electronic apparatus 100 may generate a response using only the first speech (S3115).

If the complete response may not be generated based on the first speech (S3110-N), the electronic apparatus 100 may acquire second speech (S3120). The electronic apparatus 100 may acquire similarity between the first speech and the second speech (S3125). The electronic apparatus 100 may identify whether the similarity is a threshold value or more (S3130). If the similarity is less than the threshold value (S3130-N), the electronic apparatus 100 may repeatedly acquire new second speech.

If the similarity is the threshold value or more (S3130-Y), the electronic apparatus 100 may generate a response based on the first speech and the second speech (S3135).

According to an embodiment, the similarity may be similarity with respect to full text data of the first speech and the second speech.

According to an embodiment, the similarity may include similarity between the intention words and the target words, respectively. For example, the similarity may include first similarity between the intention words and second similarity between the target words. If the similarity is separate, the operation of determining whether the similarity is the threshold value or more may also be separately performed.

Figure 32:
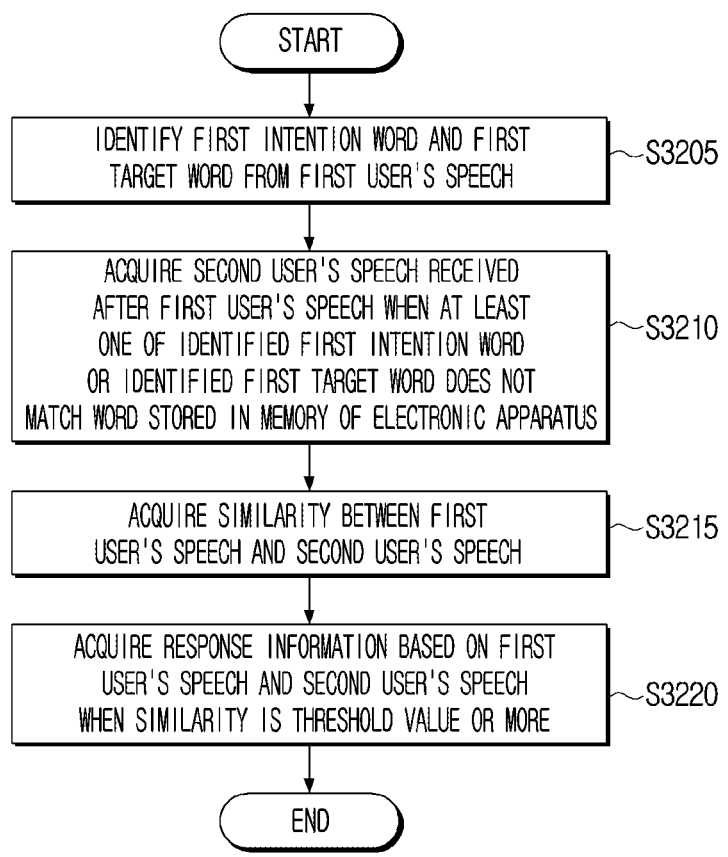
FIG. 32 is a flowchart illustrating an example method of controlling an electronic apparatus according to various embodiments.

FIG. 32 is a flowchart illustrating an example method of controlling the electronic apparatus 100 according to various embodiments.

Referring to FIG. 32, the method of controlling the electronic apparatus 100 includes identifying (S3250) a first intention word and a first target word from first user's speech, acquiring (S3210) second user's speech received after the first user's speech when at least one of the identified first intention word or the identified first target word does not match a word stored in the memory 110 of the electronic apparatus 100, acquiring (S3215) similarity between the first user's speech and the second user's speech, and acquiring (S3220) response information based on the first user's speech and the second user's speech when the similarity is a threshold value or more.

The method may further include acquiring a user interface (UI) guiding to utter the second user's speech when at least one of the identified first intention word or the identified first target word does not match the word stored in the memory 110.

When at least one of the identified first intention word or the identified first target word does not match the word stored in the memory 110, the method may further include acquiring user's speech received within a preset time as the second user's speech.

The method may further include acquiring a second intention word included in the second user's speech when the first intention word does not match the intention word stored in the memory 110 and the first target word matches the target word stored in the memory 110, in the acquiring (S3215) of the similarity, when the second intention word matches the intention word stored in the memory 110, first similarity between the first intention word and the second intention word may be acquired, and in the acquiring (S3220) of the response information, when the first similarity is a threshold value or more, the response information may be acquired based on the second intention word and the first target word.

The method may further include acquiring a UI including information notifying that the response information may not be acquired when the second intention word does not match the intention word stored in the memory 110, and the UI may include the second intention word.

The method may further include acquiring a second target word included in the second user's speech when the first intention word matches the intention word stored in the memory 110 and the first target word does not match the target word stored in the memory 110, in the acquiring (S3215) of the similarity, second similarity between the first target word and the second target word may be acquired when the second target word matches the target word stored in the memory 110, and in the acquiring (S3220) of the response information, the response information may be acquired based on the first intention word and the second target word when the second similarity is a threshold value or more.

The method may further include acquiring a UI including information notifying that the response information may not be acquired when the second target word does not match the target word stored in the memory 110, and the UI may include the second target word.

The method may further include acquiring the second intention word and the second target word included in the second user's speech when the first intention word does not match the intention word stored in the memory 110 and the first target word does not match the target word stored in the memory 110, in the acquiring (S3215) of the similarity, first similarity between the first intention word and the second intention word may be acquired when the second intention word matches the intention word stored in the memory 110, and second similarity between the first target word and the second target word may be acquired when the second target word matches the target word stored in the memory 110, and in the acquiring (S3220) of the response information, the response information may be acquired based on the second intention word and the second target word when the first similarity is a threshold value or more and the second similarity is the threshold value or more.

The method may further include acquiring a UI including information notifying that the response information may not be acquired when the second intention word does not match the intention word stored in the memory 110 or when the second target word does not match the target word stored in the memory 110, and the UI may include the second target word.

The method may further include acquiring the second intention word and the second target word from the second user's speech, in the acquiring (S3215) of the similarity, first similarity between the first intention word and the second intention word may be acquired, and second similarity between the first target word and the second target word may be acquired, and the controlling method may further include acquiring third user's speech received after the second user's speech when the first similarity is less than the threshold value or the second similarity is less than a second threshold value.

The method of the electronic apparatus as illustrated in FIG. 32 may be executed on the electronic apparatus having the configuration of FIG. 1 or 2, and may also be executed on an electronic apparatus having other configurations.

The various example methods according to the various embodiments of the disclosure described above may be implemented in the form of an application installable on an existing electronic apparatus.

The example methods according to the various embodiments of the disclosure described above may be implemented by upgrading software or hardware of the existing electronic apparatus.

The various embodiments of the disclosure described above may also be performed through an embedded server included in the electronic apparatus, or an external server of at least one of the electronic apparatus or a display device.

According to an embodiment of the disclosure, the various embodiments described hereinabove may be implemented by software including instructions that are stored in machine (e.g., a computer)-readable storage media. The machine is an apparatus that invokes the stored instructions from the storage media and is operable according to the invoked instructions, and may include the electronic apparatus according to the disclosed embodiments. When the commands are executed by the processor, the processor may perform functions corresponding to the commands, either directly or using other components under the control of the processor. The commands may include codes made by a compiler or codes executable an interpreter. The machine-readable storage medium may be provided in the form of a non-transitory storage medium. The 'non-transitory' storage medium may not include a signal and is tangible, and does not distinguish whether data is stored semi-permanently or temporarily in the storage medium.

In addition, according to an embodiment of the disclosure, the method according to the various embodiments described above may be included and provided in a computer program product. The computer program product may be traded as a product between a seller and a purchaser. The computer program product may be distributed in the form of a machine-readable storage medium (e.g., a compact disc read only memory (CD-ROM)), or online through an application store (e.g., PlayStore™). In the case of the online distribution, at least a portion of the computer program product may be at least temporarily stored in a storage medium such as a memory of a server of a manufacturer, a server of an application store, or a relay server, or be temporarily generated.

In addition, each of the components (e.g., modules or programs) according to the various embodiments described above may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration. The operations performed by the module, the program, or other component, in accordance with the various embodiments may be executed in a sequential, parallel, iterative, or heuristic manner, or at least some operations may be executed in a different order or omitted, or other operations may be added.

Although the disclosure has been illustrated and described with reference to various example embodiments, the disclosure is not limited to the abovementioned embodiments, but may be variously modified by those skilled in the art to which the disclosure pertains without departing from the true spirit and full scope of the disclosure, including the accompanying claims and their equivalents. It will also be understood that any of the embodiment(s) described herein may be used in conjunction with any other embodiment(s) described herein.

What is claimed is:

1. An electronic apparatus comprising:
a memory storing one or more commands; and
a processor connected to the memory and configured to control the electronic apparatus,
wherein the processor comprises processing circuitry and is configured, by executing the one or more instructions, to:
identify a first intention word and a first target word from first speech,
acquire second speech received after the first speech based on at least one of the identified first intention word or the identified first target word not matching a word stored in the memory,
acquire a similarity between the first speech and the second speech, and
acquire response information based on the first speech and the second speech based on the similarity being a threshold value or more,
based on the first intention word not matching an intention word stored in the memory and the first target word matching a target word stored in the memory,
    acquire a second intention word included in the second speech,
    acquire a first similarity between the first intention word and the second intention word based on the second intention word matching the intention word stored in the memory, and
    acquire response information based on the second intention word and the first target word based on the first similarity being a threshold value or more,
and/or
based on the first intention word matching an intention word stored in the memory and the first target word not matching a target word stored in the memory,
    acquire a second target word included in the second speech
    acquire second similarity between the first target word and the second target word based on the second target word matching the target word stored in the memory, and
    acquire response information based on the first intention word and the second target word based on the second similarity being a threshold value or more.

2. The electronic apparatus as claimed in claim 1, wherein the processor is configured to acquire a user interface (UI) configured to provide a guide to utter the second speech based on at least one of the identified first intention word or the identified first target word not matching the word stored in the memory.

3. The electronic apparatus as claimed in claim 1, wherein the processor is configured to acquire speech received within a preset time as the second speech based on at least one of the identified first intention word or the identified first target word not matching the word stored in the memory.

4. The electronic apparatus as claimed in claim 1, wherein the processor is configured to acquire a UI including information notifying that the response information is not acquired based on the second intention word not matching the intention word stored in the memory, and
the UI includes the second intention word.

5. The electronic apparatus as claimed in claim 1, wherein the processor is configured to acquire a UI including information notifying that the response information is not acquired based on the second target word not matching the target word stored in the memory, and
the UI includes the second target word.

6. The electronic apparatus as claimed in claim 1, wherein the processor is configured to:
acquire a second intention word and a second target word included in the second speech based on the first intention word not matching an intention word stored in the memory and the first target word not matching a target word stored in the memory,
acquire a first similarity between the first intention word and the second intention word based on the second intention word matching the intention word stored in the memory,
acquire a second similarity between the first target word and the second target word based on the second target word matching the target word stored in the memory, and
acquire response information based on the second intention word and the second target word based on the first similarity being a threshold value or more and the second similarity being the threshold value or more.

7. The electronic apparatus as claimed in claim 6, wherein the processor is configured to acquire a UI including information notifying that the response information is not acquired based on the intention word not matching the intention word stored in the memory or the second target word not matching the target word stored in the memory, and
the UI includes the second target word.

8. The electronic apparatus as claimed in claim 1, wherein the processor is configured to:
acquire a second intention word and a second target word from the second speech,
acquire a first similarity between the first intention word and the second intention word,
acquire a second similarity between the first target word and the second target word, and
acquire third speech received after the second speech based on the first similarity being less than a threshold value or the second similarity being less than a second threshold value.

9. A method of controlling an electronic apparatus, the method comprising:
identifying a first intention word and a first target word from first speech;
acquiring second speech received after the first speech based on at least one of the identified first intention word or the identified first target word not matching a word stored in the memory of the electronic apparatus;
acquiring a similarity between the first speech and the second speech; and
acquiring response information based on the first speech and the second speech based on the similarity being a threshold value or more,
based on the first intention word not matching an intention word stored in the memory and the first target word matching a target word stored in the memory,
acquiring a second intention word included in the second speech, acquiring a first similarity between the first intention word and the second intention word based on the second intention word matching the intention word stored in the memory, and acquiring response information based on the second intention word and the first target word based on the first similarity being a threshold value or more, and/or based on the first intention word matching an intention word stored in the memory and the first target word not matching a target word stored in the memory, acquiring a second target word included in the second speech, acquiring second similarity between the first target word and the second target word based on the second target word matching the target word stored in the memory, and acquiring response information based on the first intention word and the second target word based on the second similarity being a threshold value or more.

10. The method as claimed in claim 9, further comprising acquiring a user interface (UI) configured to provide a guide to utter the second speech based on at least one of the identified first intention word or the identified first target word not matching the word stored in the memory.

11. The method as claimed in claim 9, further comprising acquiring speech received within a preset time as the second speech based on at least one of the identified first intention word or the identified first target word not matching the word stored in the memory.

12. The method as claimed in claim 9, further comprising acquiring a UI including information notifying that the response information is not acquired based pm the second intention word not matching the intention word stored in the memory, wherein the UI includes the second intention word.

13. The method as claimed in claim 9, further comprising acquiring a UI including information notifying that the response information is not acquired based on the second target word not matching the target word stored in the memory, wherein the UI includes the second target word.

14. The method as claimed in claim 9, further comprising acquiring a second intention word and a second target word included in the second speech based on the first intention word not matching an intention word stored in the memory and the first target word not matching a target word stored in the memory, wherein in the acquiring of the similarity, a first similarity between the first intention word and the second intention word is acquired based on the second intention word matching the intention word stored in the memory, and a second similarity between the first target word and the second target word is acquired based on the second target word matching the target word stored in the memory, and in the acquiring of the response information, the response information is acquired based on the second intention word and the second target word based on the first similarity being a threshold value or more and the second similarity being the threshold value or more.

15. The method as claimed in claim 14, further comprising acquiring a UI including information notifying that the response information is not acquired based on the intention word not matching the intention word stored in the memory or the second target word not matching the target word stored in the memory, wherein the UI includes the second target word.

16. The method as claimed in claim 9, further comprising acquiring a second intention word and a second target word from the second user's speech, wherein in the acquiring of the similarity, a first similarity between the first intention word and the second intention word is acquired, and a second similarity between the first target word and the second target word is acquired, and the method further includes acquiring third speech received after the second speech based on the first similarity being less than a threshold value or the second similarity being less than a second threshold value.

* * * * *